(12) United States Patent
Pillai et al.

(10) Patent No.: US 9,940,583 B1
(45) Date of Patent: Apr. 10, 2018

(54) TRANSMITTING CONTENT TO KIOSK AFTER DETERMINING FUTURE LOCATION OF USER

(71) Applicant: Amazon Technologies, Inc., Seattle, WA (US)

(72) Inventors: Biju Balakrishna Pillai, Cupertino, CA (US); Kenneth Mark Karakotsios, San Jose, CA (US); Peter Cheng, Sunnyvale, CA (US); David Wayne Stafford, Cupertino, CA (US); Stephen Vincent Mangiat, San Francisco, CA (US); Yi Ding, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 761 days.

(21) Appl. No.: 14/498,615

(22) Filed: Sep. 26, 2014

(51) Int. Cl.
  *G06F 15/18* (2006.01)
  *G06N 5/04* (2006.01)
  *H04L 29/08* (2006.01)

(52) U.S. Cl.
  CPC ............... *G06N 5/04* (2013.01); *H04L 67/10* (2013.01)

(58) Field of Classification Search
  CPC ........................................................ G06F 3/017
  USPC ........................................ 706/12, 15, 20, 45
  See application file for complete search history.

(56) References Cited

U.S. PATENT DOCUMENTS

| | | | |
|---|---|---|---|
| 6,226,739 B1 | 5/2001 | Eagle | |
| 2003/0155417 A1 | 8/2003 | Fairman | |
| 2009/0079813 A1 | 3/2009 | Hildreth | |
| 2009/0117846 A1* | 5/2009 | Mavrakakis | H04N 5/765 455/3.06 |
| 2010/0174655 A1 | 7/2010 | Butler et al. | |
| 2010/0302257 A1 | 12/2010 | Perez et al. | |
| 2011/0013501 A1 | 1/2011 | Curtis | |
| 2011/0153071 A1 | 6/2011 | Claessen | |
| 2012/0011540 A1 | 1/2012 | Pulford | |
| 2013/0194238 A1 | 8/2013 | Sakai | |
| 2013/0198326 A1 | 8/2013 | Kessel et al. | |
| 2013/0222266 A1 | 8/2013 | Gardenfors et al. | |

(Continued)

FOREIGN PATENT DOCUMENTS

JP 2013093907 A 5/2013

OTHER PUBLICATIONS

Office action for U.S. Appl. No. 14/498,687, dated Jul. 27, 2016, Pillai et al., "Wirelessly Preparing Device for High Speed Data Transfer", 19 pages.

(Continued)

*Primary Examiner* — David Vincent
(74) *Attorney, Agent, or Firm* — Lee & Hayes, PLLC

(57) ABSTRACT

This disclosure is directed at least partly to a cloud prediction device that provides information to a kiosk. The cloud prediction device may receive information from a user device associated with a user, such as travel information, itineraries, calendar events, emails, etc, which may be used to determine the information. The information may also include user preferences, user recommendations, and/or historical data that may be used to determine content to be provided by the kiosk for the user and/or other users. The kiosk may provide innovative user interfaces to engage a user and provide high speed data transfer of content to a user device associated with the user. The kiosk may be located in frequently visited locations such as travel terminals or public spaces.

20 Claims, 16 Drawing Sheets

(56) References Cited

U.S. PATENT DOCUMENTS

| | | | |
|---|---|---|---|
| 2013/0304592 A1 | 11/2013 | Willson | |
| 2014/0136443 A1* | 5/2014 | Kinsey, II | G06Q 10/063116 |
| | | | 705/347 |
| 2014/0282224 A1 | 9/2014 | Pedley | |
| 2014/0372235 A1* | 12/2014 | Aldomar | G06Q 30/0613 |
| | | | 705/21 |
| 2015/0066606 A1* | 3/2015 | Smirin | G06Q 30/0633 |
| | | | 705/13 |
| 2016/0092034 A1 | 3/2016 | Pillai et al. | |

OTHER PUBLICATIONS

Office action for U.S. Appl. No. 14/498,270, dated Feb. 9, 2017, Pillai, "Kiosk Providing High Speed Data Transfer ", 23 pages.
Office action for U.S. Appl. No. 14/498,687, dated Mar. 10, 2017m Pillai et al., "Wirelessly Preparing Device for High Speed Data Transfer", 28 pages.
The PCT Search Report dated Dec. 9, 2015 mailed Dec. 9, 2015 for PCT application No. PCT/US2015/051794, 13 pages.
Office Action for U.S. Appl. No. 14/498,270, dated Sep. 21, 2017, Pillai, "Kiosk Providing High Speed Data Transfer", 30 pages.

\* cited by examiner

TRANSMITTING CONTENT TO KIOSK AFTER DETERMINING FUTURE LOCATION OF USER

BACKGROUND

Computing devices have become commonplace in almost every environment. For example, mobile telephones, laptop computers, and tablet computers are commonly used for work and pleasure and accompany people in many daily activities. People often travel with computers and mobile phones and use these devices in public places.

One frequent drawback of computing devices is an amount of time and effort required to load new and desirable content onto the devices. To add new content, a user typically has to locate a source of the content, select the content, initiate transfer of the content, and maintain connectivity of the device to a source of the content while the content is downloaded to the device. Some content takes a relatively long amount of time to download, such as a full length high definition movie, which complicates the process. Because of the time constraints, adding new content often requires advance planning prior to a time when the user expects to use access the content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
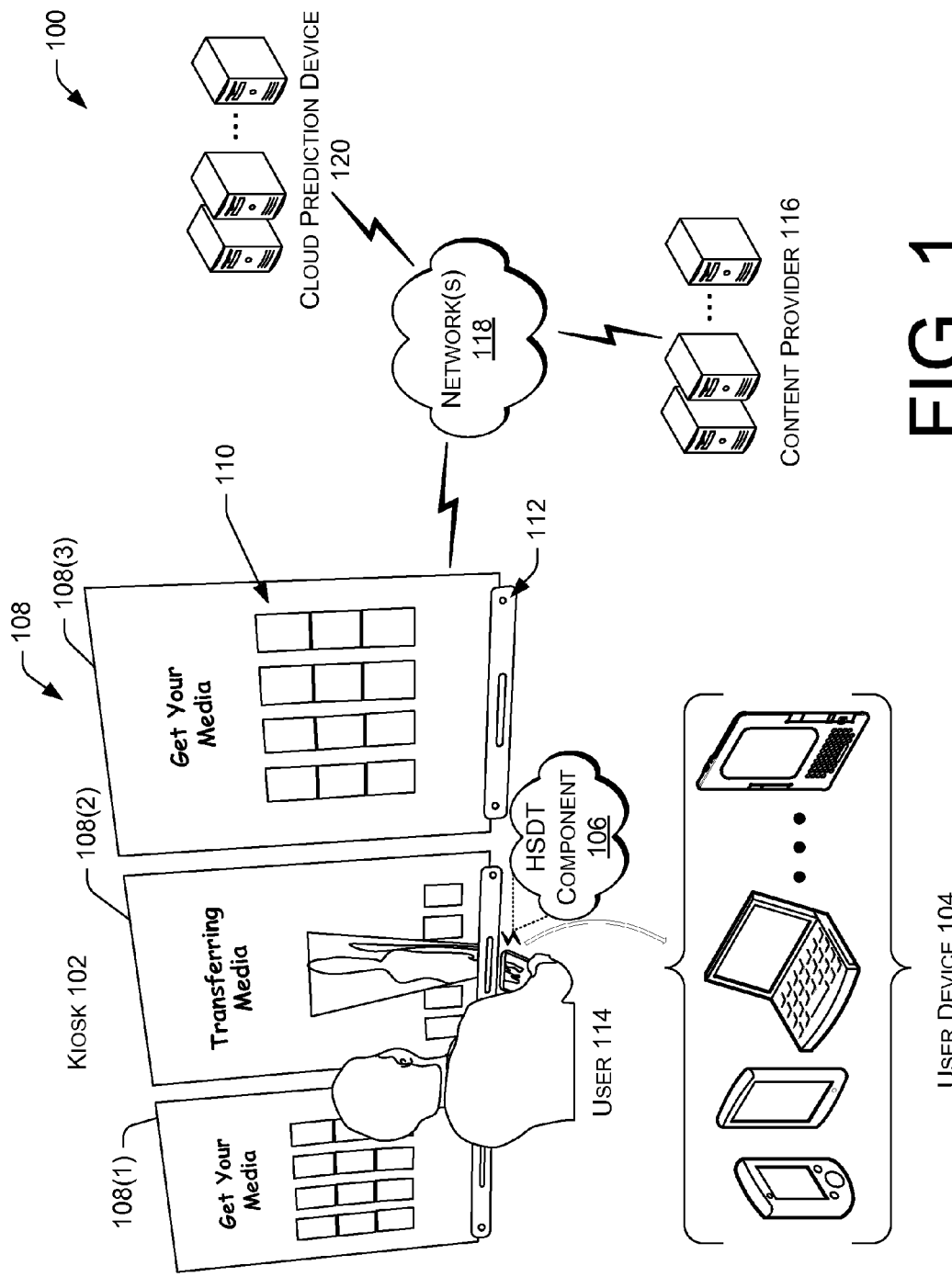
FIG. 1 is a schematic diagram of an illustrative computing environment that includes a kiosk providing high speed data transfer of content.

This disclosure is directed at least partly to a kiosk that provides innovative user interfaces to engage a user and provide high speed data transfer of content to a user device associated with the user. The kiosk may be located in frequently visited locations such as airports, bus stops, train stations, shopping malls, libraries, office buildings, and/or other private or public spaces that are accessible by many users. The kiosks may advertise content and provide instructions to users about how to receive some of the content on user devices via a high speed data transfer. The high speed data transfer may use Waveconnex® technology or other high speed data transfer protocols that enable download of a standard definition full length movie (e.g., less than 1 GB of data) in less than a couple of seconds or download of a high definition full length movie (e.g., 2-3 GB of data) in a few seconds. Besides, movies, other content may be downloaded such as electronic documents (e.g., electronic books, electronic magazines, etc.), music, games, multimedia presentations, and other electronic content/media available from an electronic catalog.

The kiosk may use various user interfaces to engage with a user, provide instructions to the user, provide a browsable and/or searchable electronic catalog to the user, and allow selection of content to transfer to a user device. In some embodiments, the kiosk may perform a dynamic and adaptable process to induce user engagement with one or more passerby. For example, the kiosk may provide a message intended for a specific user that is identified as being near the kiosk, provide a display that mimics an action of a person near the kiosk, and/or perform other operations to attract attention from a user near the kiosk. The kiosk may employ machine learning to update the process to more effectively engage users based on attributes of users, success/failure instances, environmental factors (e.g., time, location, etc.), and/or other factors.

The kiosk may customize a presentation of content for a user based on one or more factors, such as an attribute of the user, a time of day, a location, information received from a device associated with the user, and/or other information. By customizing the presentation of the content, the kiosk may allow the user to quickly find content of interest to the user. For example, the kiosk may use optical character recognition to identify that the user is wearing a t-shirt that includes a name of a particular music group. The kiosk may then use that information to select content to be presented to the user (e.g., similar types of music as the identified music group). As another example, an image of the user may reveal presence of family members and/or children near the user, which may indicate a possible type of content of interest to the user (e.g., family-friendly content). As yet another example, the kiosk may obtain access, after consent by a user, to some information available from the user's device. The information may include travel information, previous downloads, and/or other information. The travel information may be from a ticket, an itinerary, a calendar entry, or other sources. The kiosk may use this information to select content for presentation to the user, such as content that is similar to previously downloaded content and that can be consumed within an amount of time of travel of an identified upcoming trip (e.g., a two hour flight). In some embodiments, the kiosk may employ machine learning to update a selection process that selects the content for presentation to a user based on effectiveness of prior selections.

The techniques and systems described herein may be implemented in a number of ways. Example implementations are provided below with reference to the following figures.

FIG. 1 is a schematic diagram of an illustrative computing environment 100 that includes a kiosk 102 providing high speed data transfer of content. The kiosk 102 may display information to guide a user to receive content on a user device 104 through a high speed data transfer component 106. The kiosk 102 may include one or more monitors 108, which may be any type of display screen. Although three monitors 108(1), 108(2), and 108(3) are shown in FIG. 1, any number of monitors may be used by the kiosk 102. When multiple monitors are included in the kiosk 102, the kiosk may synchronize operation of the monitors to provide display effects such as scrolling of content across the monitors (e.g., from one monitor to another adjacent monitor). The monitor(s) 108 may be used to provide instructions, provide advertisements, create awareness (e.g., engage a user), facilitate selection of content, entertain users, and/or be used for other reasons.

As shown in FIG. 1, a first monitor 108(1) and third monitor 108(3) show selections 110 of available titles of content, which are represented by blocks. The selections 110 may include images, text, audio, or a combination thereof. The titles may be videos, songs, albums, documents, books, magazines, puzzles, games, collections of media, and/or other types of digital content. The second monitor 108(2) may provide instructions, graphics, animation, and/or other information to assist the user in downloading content onto the user device 104 via the high speed data transfer (HSDT) component 106. Additional details about possible user interfaces deployed by the kiosk 102 are described in detail with reference to FIGS. 5A-5G.

The kiosk 102 may include one or more sensors 112 to detect and/or receive commands from a user 114. For example, the kiosk 102 may include imaging sensors that enable gesture recognition of gestures performed by the user 114. The gestures may be converted to commands that are used to cause specific functions to be performed by the kiosk 102, such as browsing of selections, downloading a selection, and so forth. In some embodiments, the kiosk 102 may modify a display or presentation based on motion of a user, distance of a user from the kiosk 102, direction that a person faces (e.g., facing the kiosk 102, facing away from the kiosk 102, etc.) and/or location of people situated near the kiosk 102 (e.g., one person is near the kiosk while others are significantly further away from the kiosk, etc.). As used herein, the term "gestures" includes intentional and unintentional commands of a user that can be received and analyzed by the kiosk 102 to create meaningful instructions or commands. The gestures may include general body language, distance, or other positioning of one's body and/or appendages either from normal body motion (regardless of prompts by the kiosk) or in response to prompts from the kiosk 102. Thus, a user's stride, head motion, and other movements as the user walks near the kiosk 102 may be included as gestures that are recognized by the kiosk, converted to meaningful commands, and used to modify the presentation of content by the kiosk 102.

The kiosk 102 may receive other types of commands, such as spoken commands, typed or inputted commands (e.g., via a virtual or physical input device), and/or data input through the user device 104, possibly via an application run by the user device 104. Thus, the sensor(s) 112 may include devices such as microphones, proximity sensors, and other environment monitoring devices. The location of the sensor(s) 112 may vary with respect to the kiosk 102, and may include placement on or within the monitors 108 and/or placement away from the monitors 108 (e.g., in a separate location such as above the monitors, on an adjacent wall, etc.).

The HSDT component 106 may use Waveconnex® technology or other high speed data transfer protocols that enable data transfer upwards of 600 Mbps, which may allow download of a full length movie in a matter of a few seconds. However, as discussed below in more detail, the kiosk 102 may exchange data with the user device 104 prior to a high speed data transfer to prepare the user device to receive the content. The preparation may include at least freeing high speed memory, such as random access memory, of the user device 104 to accommodate receipt of the content downloaded via the HSDT component 106 from the kiosk 102. The HSDT component 106 may be integrated in the kiosk 102 and/or may a separate device, which may couple to a port of the kiosk 102, such as a universal serial port (USB) port or other high speed data ports.

The kiosk 102 may include data storage that stores content, such as movies, music, electronic documents (e.g., electronic books, electronic magazines, etc.), games, and/or other digital content. The kiosk 102 may exchange data with a content provider 116 via one or more network(s) 118 to receive the content on the data storage of the kiosk 102. For example, as new content become available, the kiosk 102 may receive the new content from the content provider 116 via the network(s) 118. The kiosk 102 may purge or otherwise delete some content at times, such as to free space for new content. The network(s) 118 may include any type of wired or wireless network such as a Wi-Fi network, a mobile telephone network, a wide area network (WAN), and so forth.

In some embodiments, the environment 100 may include a cloud prediction device 120. The cloud prediction device 120 may interact with the user 114, possibly via the user device 104 or via another electronic device, to determine information received from the user. For example, the user 114 may provide travel information for access by the cloud prediction device 120 such as by booking travel through a service associated with the cloud prediction device 120. The travel information may be from a ticket, an itinerary, a calendar entry, or other sources. As another example, the user 114 may provide information to the cloud prediction device 120 indicating a future task of the user, such as to pick up a package at a public secure locker that has been delivered to the locker for the user. The cloud prediction device 120 may analyze the data and predict a future location of the user based on the analysis. For example, when the data includes flight information for the user, the cloud prediction device 120 may predict that the user will be at a specific airport, or even a specific terminal or part of the airport during a time range based at least partly on the flight information and possibly on other data from other sources (e.g., flight data for the airport, airport maps, etc.). The cloud prediction device 120 may identify a kiosk located near the predicted future location of the user. In the above example, the cloud prediction device 120 may identify a kiosk that is in a terminal associated with the user's flight. The cloud prediction device 120 may then transmit a message associated with the predicted future visit by the user to the identified kiosk and/or the content provider 116 to enable custom content for the user at the identified kiosk. For example, the content provider 116 may cause transmission of content predicted to be enjoyable and/or relevant for the user to the identified kiosk prior to the predicted arrival by the user at the kiosk.

Additional details about the content provider 116, the kiosk 102, and the user device 104 are discussed below with reference to FIGS. 2-4.

Figure 2:
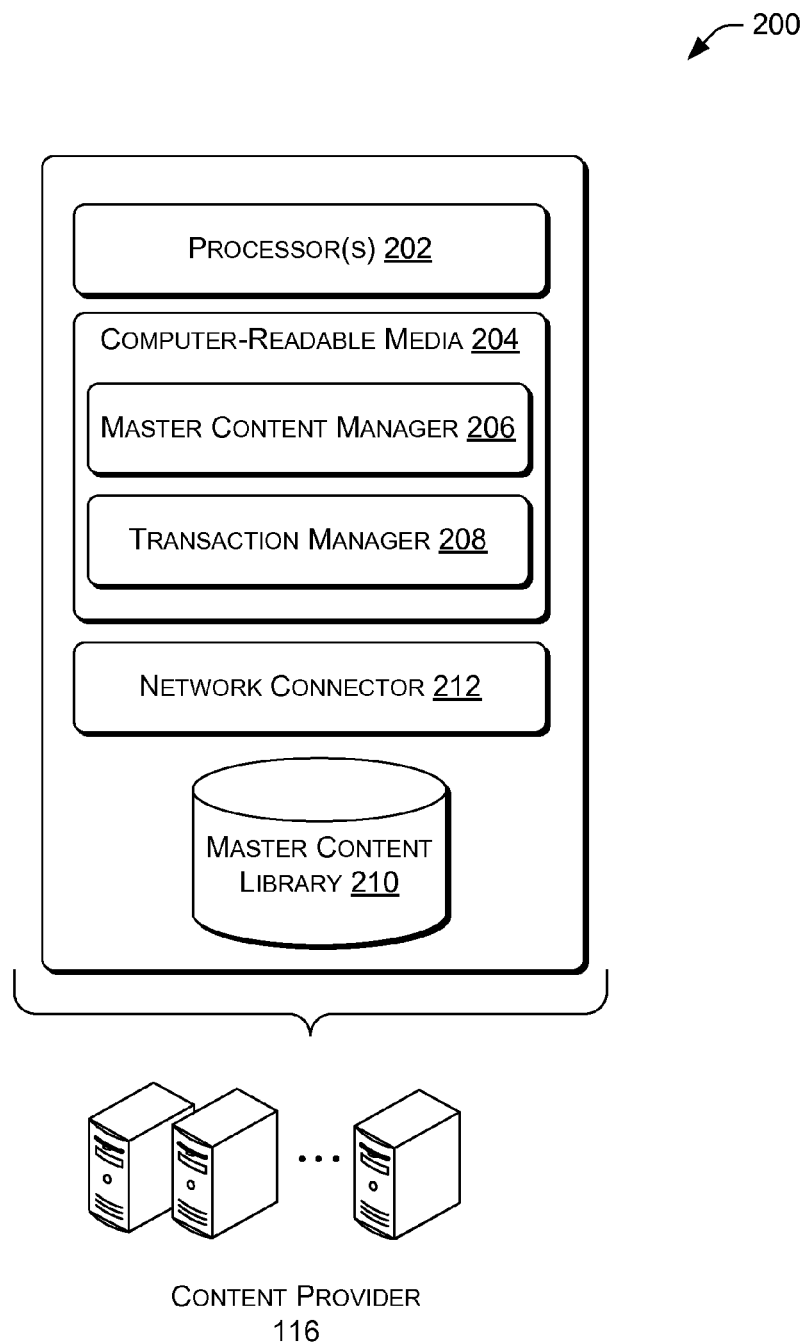
FIG. 2 is a block diagram of illustrative computing architecture of the content provider shown in FIG. 1.

FIG. 2 is a block diagram of illustrative computing architecture 200 of the content provider 116 shown in FIG. 1. The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the content provider 116.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store a master content manager 206 and a transaction manager 208, which are described in turn. The components may be stored together or in a distributed arrangement.

The master content manager 206 may manage distribution of content in a master content library 210 to the kiosk 102 and possibly to other kiosks. The master content manager 206 may provide content to the kiosks based on requests from the kiosks and/or may determine the content to be provided to the kiosks and thus transmit content to the kiosks. For example, when users can input requests, via the kiosks, for content, the kiosks may determine user preferences or demands, which may then be transmitted to the master content manager 206 for fulfillment. However, the master content manager 206 may initiate at least some content to be transmitted to the kiosks, such as newly released and/or newly available content. The master content manager 206 may also manage deletion of content on the kiosk in some embodiments. The master content manager 206 may manage licenses or other distribution rights of the content in accordance with predetermined parameters (e.g., rights of licenses, etc.).

The transaction manager 208 may manage payment transactions and/or non-payment transactions of the content provided to the kiosks and/or to the users. For example, the transaction manager 208 may facilitate processing payments for at least some content items that are consumed by users via the kiosk 102. In various embodiments, the transaction manager 208 may be deployed in a distributed arrangement (e.g., separate from the master content manager 206), such as by dedicated transaction servers.

The content provider 116 may include one or more network connector(s) 212 to enable the content provider 116 to exchange data and the content with the kiosk 102 via the network(s) 118, as shown in FIG. 1.

Figure 3:
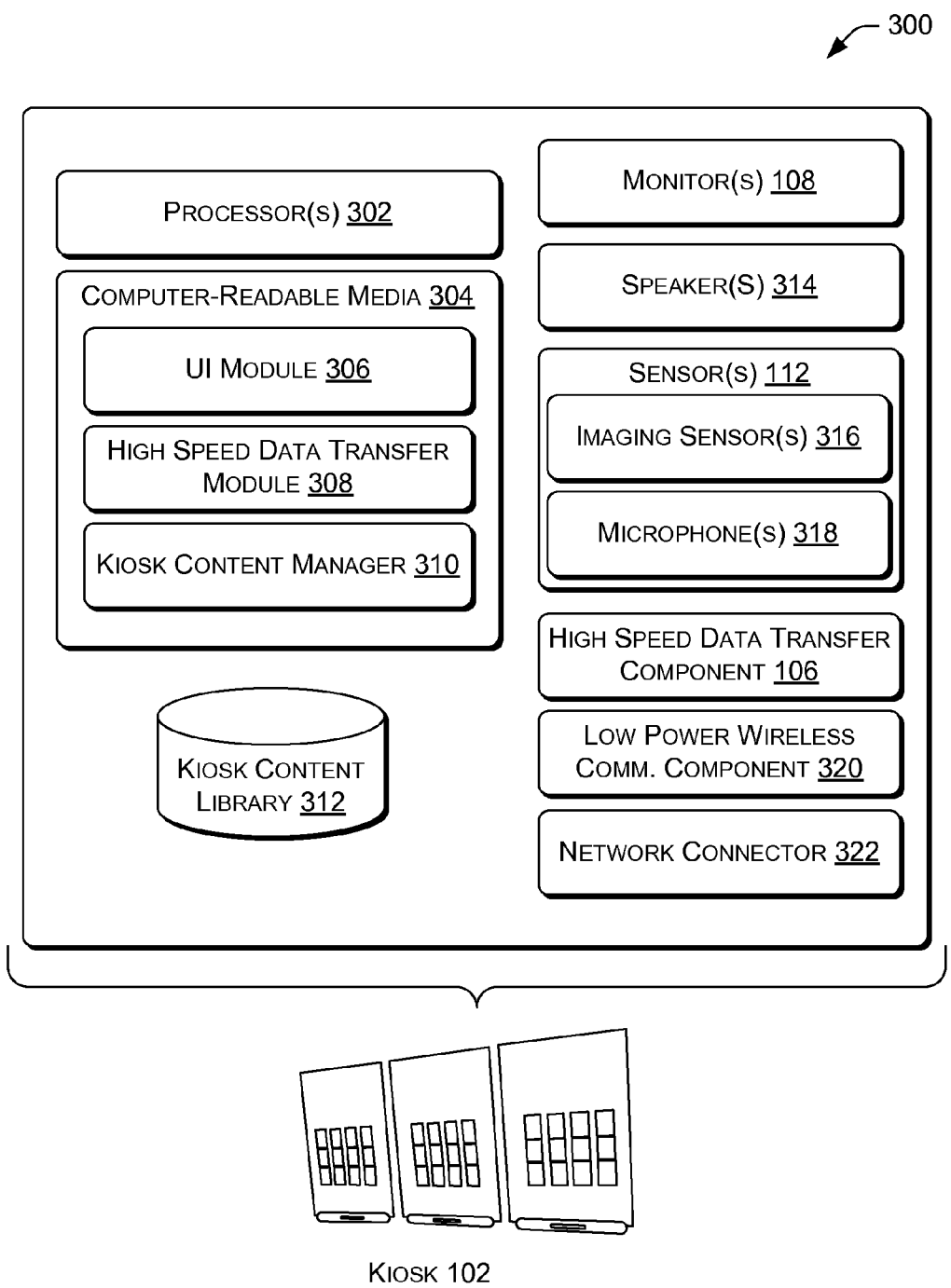
FIG. 3 is a block diagram of illustrative computing architecture of the kiosk shown in FIG. 1.

FIG. 3 is a block diagram of illustrative computing architecture 300 of the kiosk 102 shown in FIG. 1. The computing architecture 300 may include one or more processors 302 and one or more computer readable media 304 that stores various modules, applications, programs, or other data. The computer-readable media 304 may include instructions that, when executed by the one or more processors 302, cause the processors to perform the operations described herein for the kiosk 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 304 may store a user interface (UI) module 306, a high speed data transfer (HSDT) module 308 and a kiosk content manager 310, which are described in turn. The kiosk 102 may also include a kiosk content library 312, the monitor(s) 108, speakers 314, the sensors 112 (including imaging sensors 316 and/or microphones 318), the HSDT component 106, a low power wireless communication (LPWC) component 320, and/or a network connector 322. The LPWC 320 may be a Bluetooth® device, a Wi-Fi device, a near field communications (NFC) device, and/or any other devices that uses mid-range or short range wireless communications to detect the user device 104 and/or exchange data with the user device 104, such as instructions for preparing the user device for a high speed data transfer and/or other types of instructions (e.g., determining consent, etc.).

The UI module 306 may cause the monitor(s) 108 to display various UIs to facilitate engagement of the user 114 as well as providing instructions, offering content, navigating among offered content, searching, and/or making selections of content. Illustrative UIs are described with reference to FIGS. 5A-5G. In some embodiments, the UI module 306 may personalize some of the content displayed on the monitor(s) 108 based on information received from the user or associated with the user, such as attributes of the user, data received from the user device 104 associated with the user such as one or more user profiles, environmental data (e.g. time of day, destination of upcoming departing vehicles, etc.). In some embodiments, user profiles may be associated with user accounts, which may link various people, such as a family, a married couple, roommates, or other groups of people. The profiles may include general groupings, such as male/female, adult/teen/child, and so forth, each being associated with at least some different content or preferences. Custom profiles may also be maintained. The profiles may include historical information for a user, such as transaction history, browsing history, content consumed, messages sent, calendar items, and so forth. For example, each profile can have a usage history of content consumed (books read, movies watched, magazine subscriptions etc.), physical items purchased from online stores, one or more email accounts, one or more calendars, applications/services, one or more user devices (e.g., electronic document reader, phone, tablet, smart watch, television, settop box, etc.), among other things.

Thus, the UI module 306 may provide different information to different users in some instances. As another example, the UI module 306 may provide a graphical presentation to induce initial engagement by the user who may be traveling past the kiosk. The UI module 306 may provide information to the user that is customized for the user, such as a scrolling display having a scrolling speed to mimic the movement of the user (e.g., based on a movement of the user) and/or other presentations to attract the user to interact with the kiosk. The UI module 306 may employ machine learning techniques as further discussed below to update the UIs based on prior interactions with users and/or continual updating of received information, such as the environmental data. The UI module 306 may access user profiles to determine content to present to the user in some instances and when user profiles are available, such as for receipt by the kiosk 102 from the user device 104.

In some embodiments, the UI module 306 may provide transaction processing UIs to facilitate payment or non-payment transactions with users. Non-payment transactions may include restricted transactions that require membership (e.g., a service), a special privilege, redemption of credits, tokens, or similar instruments, and/or other non-monetary transactions. For example, a user with a particular qualifying product may be permitted to use the kiosk for free during some instances.

The HSDT module 308 may facilitate interaction with the user device 104 to enable a high speed data transfer of content from the kiosk content library 312 to the user device 104. In various embodiments, the HSDT module 308 may perform some preliminary functions with the user device 104, such as to free memory of the user device, initiate a handshake, and/or perform other tasks prior to transmission of the content to the user device 104. In some embodiments, the HSDT module 308 may communicate with the user device 104 via the LPWC component 320 to perform at least some preliminary functions.

When the user device 104 is ready to receive the data via the high speed data transfer, and is positioned in a corresponding location to enable the high speed data transfer and/or connected to a corresponding port (when using a wired connection), then the HSDT module 308 may cause the transfer for the content from the kiosk content library 312 to the user device 104 via the HSDT component 106. The HSDT component 106 may use Waveconnex® technology or other high speed data transfer protocols that enable data transfer upwards of 600 Mbps, which may allow transfer of a full length movie in a matter of a few seconds. As discussed above, the HSDT component 106 may use a wired connection, a wireless radio connection, an optical connection, or other types of connections to facilitate the transfer of the content from the kiosk 102 to the user device 104. In some embodiments, the position and/or location of the user device 104 with respect to the kiosk 102 may be predetermined and/or specified. For example, some technologies may require a close proximity of the user device 104 to the HSDT component 106, such as within a couple of inches (or a couple of centimeters) or other distance.

Although data transfer to the user device is discussed, the HSDT 106 may also be used to receive a data transfer from the user device 104. The user device 104 may upload data to the kiosk 102 via the HSDT component, such as to back up important data, upload personal video and/or pictures, return a loaner digital item, or for other reasons. To perform a transfer of data from the user device 104 to the kiosk 102, the processes discussed herein for the transfer of data to the user device 104 may be reversed to accommodate the upload of data from the user device 104 to the kiosk 102. As an example, the user device 104 may store data to be transferred in high speed memory, and then transfer the data using the HSDT component 106.

The kiosk content manager 310 may manage selections of the content made available by the kiosk to the user. The kiosk content manager 310 may communicate with the master content manager 206 of the content provider 116, via the network connector 322, to request content (e.g., from user searches, etc.), receive content, and/or manage existing content stored in the kiosk content library 312.

As discussed above, the kiosk 102 may be located in frequently visited locations such as airports, bus stops, train stations, shopping malls, convenient stores, near delivery lockers, libraries, office buildings, apartment buildings, homes, sporting venues and/or other private or public spaces that are accessible by many users. The kiosk 102 may be used as an edge server in some instances to allow users to quickly exchange data between a user device and the kiosk via the HSDT component 106.

Figure 4:
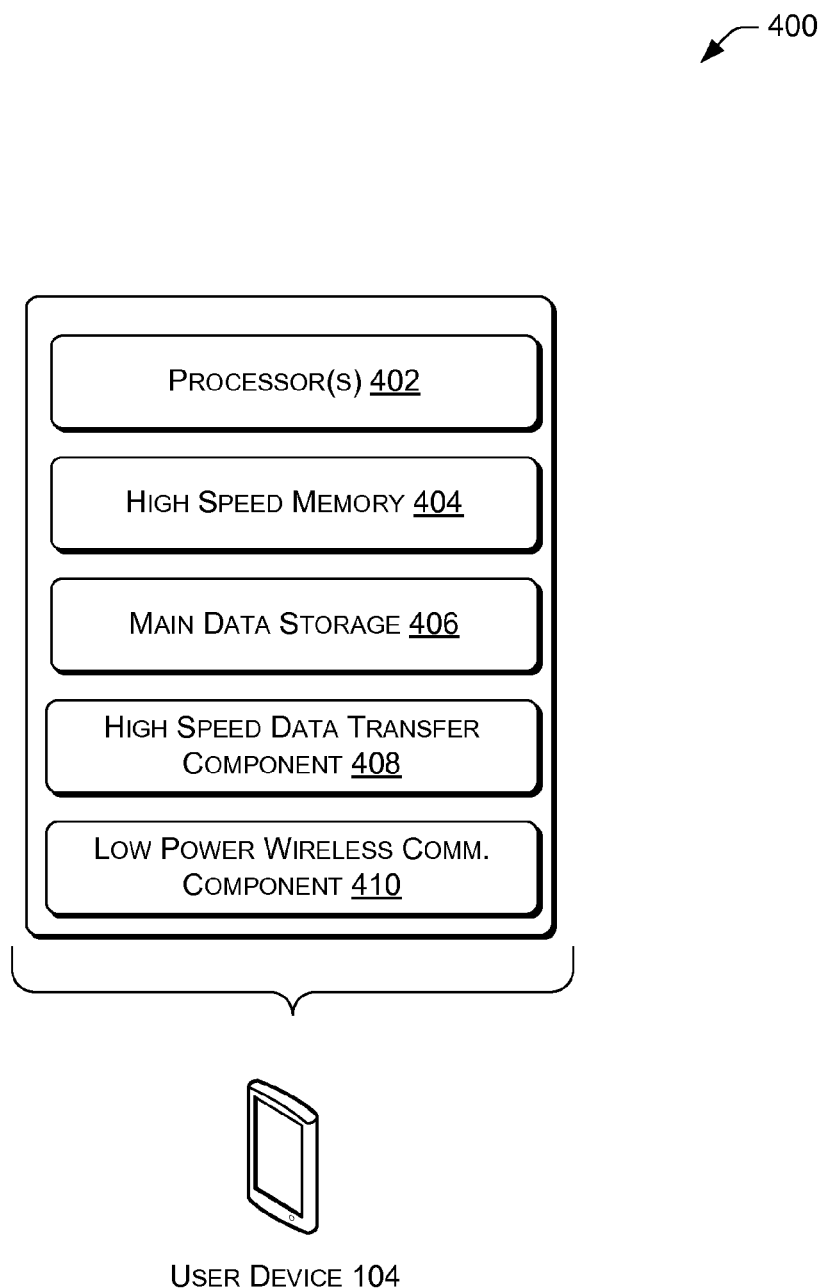
FIG. 4 is a block diagram of illustrative computing architecture of the user device shown in FIG. 1.

FIG. 4 is a block diagram of illustrative computing architecture 400 of the user device 104 shown in FIG. 1. The computing architecture 400 may include at least one or more processors 402, high speed memory 404, main data storage 406, a HSDT component 408, and an LPWC component 410.

As shown, the computing architecture 400 may include at least two types of memory, which may include high speed memory 404 and main data storage 406. The high sped memory 404 may include random access memory (RAM) that is typically used by the user device 104 to store application data for applications that are currently executing or expected to momentarily be executed by the one or more processors 402. The main data storage 406 may be permanent memory used to permanently store data, such as media content (e.g., movies, documents, music, games, applications, etc.) using flash memory, a magnetic disk, and/or using other storage hardware. The high speed memory 404 may be capable of write speeds that match the data transmission speed of the HSDT component 408, such as up to 600 Mbps. However, the main data storage 406 may have slower write speeds than the high speed memory 404.

To accommodate the slower write speeds of the main data storage 406, the content downloaded from the kiosk 102, via the HSDT components 106 and 408, to the user device 104 may be initially written to the high speed memory 404, and then subsequently written to the main data storage 406 at the slower data write speeds. The high speed memory 404 may be at least partially cleared before a high speed data transfer, such as by a preparation process initiated by the HSDT module 308 of the kiosk 102 using communications through the LPWC component 410. The preparation may include temporarily moving at least some pre-existing data from the high speed memory 404 to other memory (e.g., the main data storage 406, etc.). After writing the downloaded content from the high speed memory 404 to the main data storage 406, at least some of the pre-existing data from the high speed memory 404 may be re-written to the high speed memory 404 to enable continued use of the user device 104. Thus, at least some functionality of the user device 104 may be limited during the high speed data transfer of the content from the kiosk 102 to the user device 104 and possibly for a short duration after the transfer until the high speed memory 404 is at least partially repopulated with the pre-existing data enabling the user device 104 to resume prior functionality. Further details of the interaction of the user device 104 and the kiosk 102 during a high speed data transmission are provided below.

In some embodiments, the user device 104 may provide content requests and/or information to the kiosk 102, such as via the LPWC component 410, to signal the kiosk 102 to provide specific content to the user, retrieve specific content, and/or provide other types of custom content. For example, the user device 104 may include a media application that tracks content viewed by the user and determines recommendations for additional content for the user. This application may generate information that may be transmitted to the kiosk 102 to allow the kiosk 102 to obtain such content for an offer to the user, and then for possible receipt by the user device 104 by the HSDT component 106. Thus, the user device 104 may "fling" data to the kiosk 102 to indicate likes/dislikes of the user, and thus enable the kiosk 102 to provide custom content for the user associated with that user device.

Figure 5:
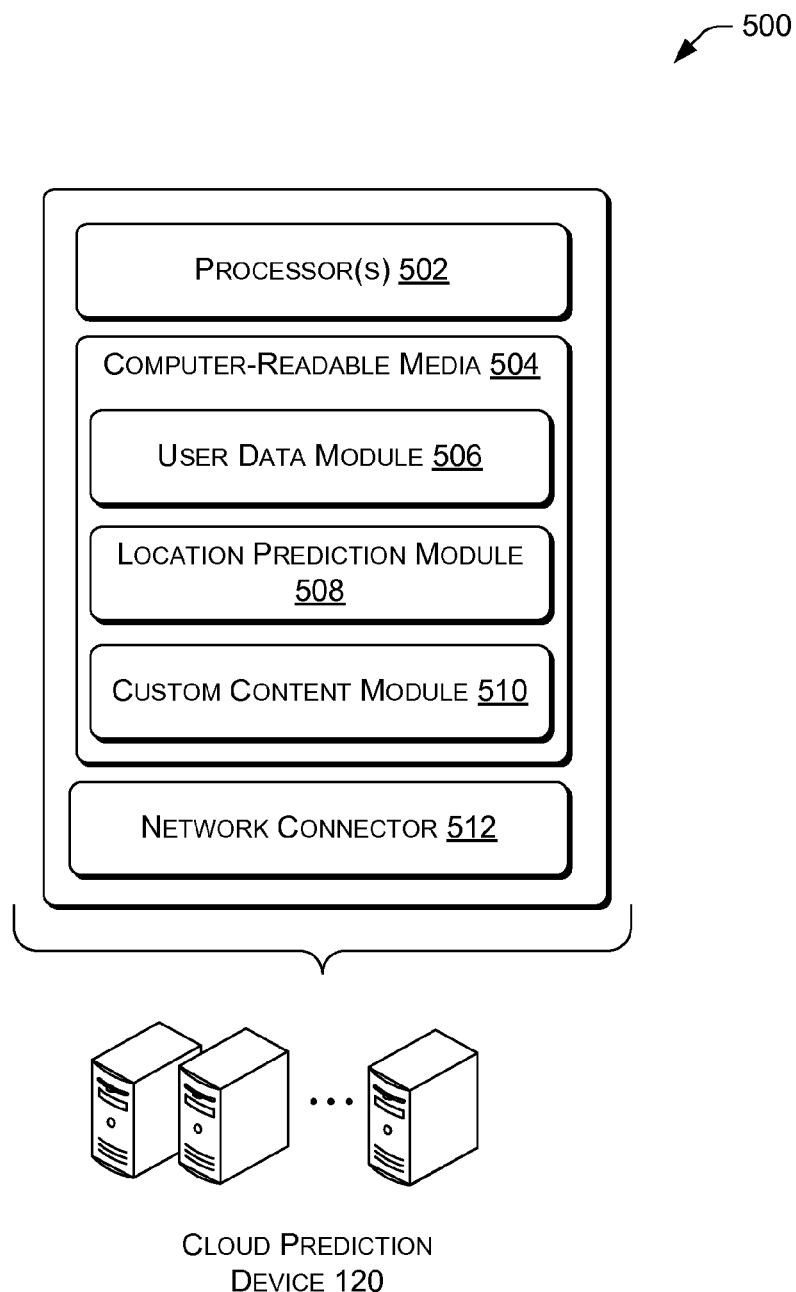
FIG. 5 is a block diagram of an illustrative computing architecture of the cloud prediction device shown in FIG. 1.

FIG. 5 is a block diagram of an illustrative computing architecture 500 of the cloud prediction device shown in FIG. 1. The computing architecture 500 may include one or more processors 502 and one or more computer readable media 504 that stores various modules, applications, programs, or other data. The computer-readable media 504 may include instructions that, when executed by the one or more processors 502, cause the processors to perform the operations described herein for the cloud prediction device 120.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 504 may store a user data module 506, a location prediction module 508, and a custom content module 510, which are described in turn. The components may be stored together or in a distributed arrangement.

The user data module 506 may receive user data through interaction with the user 114, possibly via the user device 104. For example, the user data 504 may include travel data, purchase data, delivery data, and/or other types of data. The user data 504 may be received by the user data module 506 from user input, from providing services for the user, and/or from other services that interact with the user. The user data module 506 may require user consent before accessing the user data. Examples of the user data include travel information accessed from a calendar and/or from a booking service. Another example includes purchase history associated with a service that requires the user to travel to a known place, such as a theater, sporting event, public locker, retail store, or other known place. In a more complex analysis, the user data module 506 may determine a location of travel and an item desired by the user based on user interaction. The user data module 506 may then cause an offer to be provided to the user to deliver the item to the destination, possibly via a communication through the kiosk 102.

The location prediction module 508 may analyze the user data and predict a future location of the user based on the analysis. For example, when the data includes flight information for the user, the location prediction module 508 may predict that the user will be at a specific airport, or even a specific terminal or part of the airport during a time range based at least partly on the flight information and possibly on other data from other sources (e.g., flight data for the airport, etc.). The location prediction module 508 may identify a kiosk located near the predicted future location of the user. In the above example, the location prediction module 508 may identify a kiosk that is in a terminal associated with the user's flight. In other examples, the location prediction module 508 may identify a kiosk along a path that the user is likely to take based on a predicted future location of the user and routing information.

The custom content module 510 may identify custom content for the user based at least in part on interactions with the user or other user data accessible by the cloud prediction device, such as user purchase history, user preferences, and so forth. The custom content may be digital content recommended for the user that is capable of high speed data transmission via the kiosk 102. The custom content module 510 may transmit a message associated with the predicted future visit by the user to the identified kiosk and/or the content provider 116 and recommended customer content to enable delivery of the custom content to the user at the identified kiosk. For example, the content provider 116 may cause transmission of content predicted to be enjoyable and/or relevant for the user to the identified kiosk prior to the predicted arrival by the user at the kiosk.

The cloud prediction device 120 may include one or more network connector(s) 512 to enable the cloud prediction device 120 to exchange data with at least one of the content provider 116 or the kiosk 102 via the network(s) 118, as shown in FIG. 1. For example, the cloud prediction device 120 may provide data to the content provider 116 to instruct the content provider 116 to load the custom content on an identified kiosk.

FIGS. 6A-6G show illustrative user interfaces (UIs) of the kiosk 102 during interaction with a user. The interactions allow a user device to receive content via a high speed data transfer from the kiosk 102. Although the UIs are shown across three segments that correspond to different monitors, the UIs may be provided on a single monitor or to any other number of monitors. The following discussion focuses on visual aspects of the kiosk 102. However, as previously mentioned, the kiosk 102 may emit sound via the speakers 314 to supplement the visual displays mentioned herein. The kiosks may also provide other types of feedback, such as haptic or tactile feedback to the users.

Figure 6A:
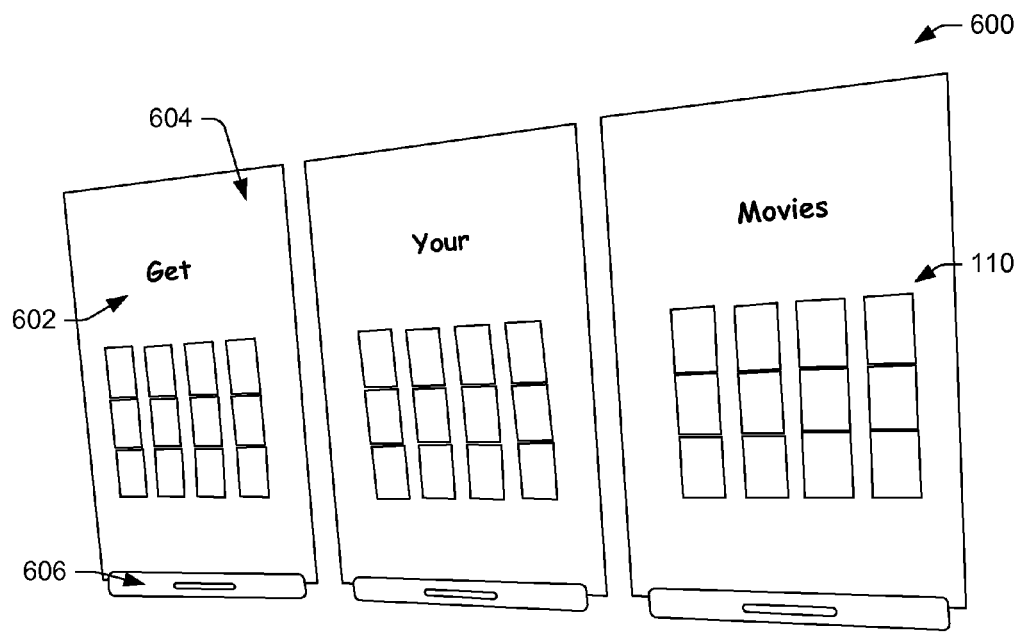
FIGS. 6A-6G show illustrative user interfaces of the kiosk during interaction with a user. The interactions allow a user device to receive content via a high speed data transfer from the kiosk.

FIG. 6A shows an illustrative UI 600 that displays at least some of the selections 110 of content available for high speed download via the kiosk 102. In some embodiments, the selections 110 are dynamically updated, such as randomly, at intervals, and so forth. The selections 110 may be all of a same media type (e.g., movies), grouped by different media types (e.g., music, movies, documents, games, etc.), or mixed (i.e., no grouping). In some embodiments, the UI 600 may show a preview of some of the selections 110 of content, such as by filling a portion of the UI 600 with a larger content selection and then showing parts of that selection (e.g., playing a trailer of a movie that is a selection, revealing pages of a magazine, etc.).

The UI 600 may include one or more messages 602 that provide information to spectators (e.g., potential users). The messages may be static, dynamic, scrolling, randomly updated, and/or otherwise modified. The message 602 may advertise services of the kiosk, provide instructions on how to use the kiosk, and/or provide other information to the user or perspective users.

The UI 600 may include a background 604, which may be dynamically updated to create a visual appeal and possibly to induce engagement by users. For example the background may be made to match a corresponding surrounding (e.g., match wall color), and then may flash highly contrasting colors from the color of the surrounding walls (or other colors), to create attention to the display of the kiosk 102. The background 604 may be used for other display purposes as well, such as to define groupings of content, indicate user control of a monitor when multiple users interact with the kiosk 102, and for other reasons.

In various embodiments, the UI 600 may include elements in a high speed data transfer (HSDT) panel 606, such as lights, speakers, and/or other elements to create attention to the HSDT functions of the kiosk 102.

Figure 6B:
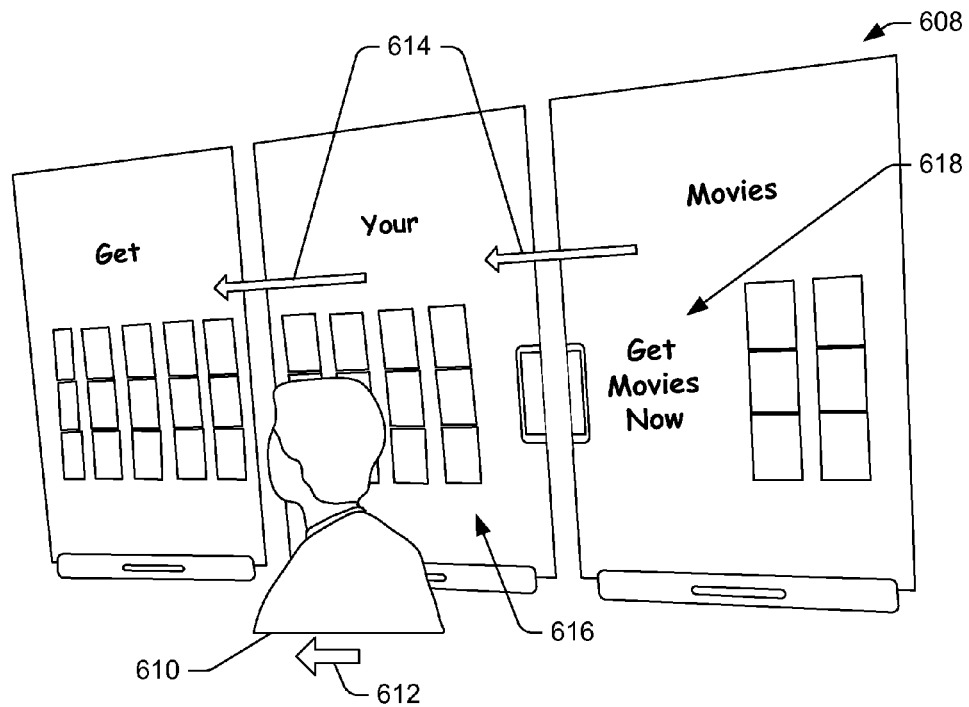

FIG. 6B shows an illustrative UI 608. The UI 608 is an example UI to induce engagement by a prospective user 610, such as a person that is near the kiosk 102 or is walking past the kiosk 102. In some embodiments, the kiosk 102 may limit or define prospective users to people that are associated with (e.g., carrying, wearing, etc.) a detected user device (e.g., the user device 104) that is identifiable as capable of a high speed data transfer. For example, the kiosk 102 may determine a location of a user device using the LPWC component 320 and determine a location of a user using the imaging sensor 316. The kiosk 102 may then associate the user device 104 and the user 114 when the location overlap or are within a predetermined threshold distance amount. The kiosk 102 may continue to track users and associated user devices in a corresponding manner during user interaction with the kiosk 102, including when multiple users interact with the kiosk at a same time.

The prospective user 610 has a movement velocity shown by a user arrow 612. The content displayed by the UI 608 may scroll or otherwise move at a same or similar velocity as the prospective user's velocity and in a same direction, as shown by arrows 614. The scrolling may move content across adjacent monitors when multiple monitors are included in the kiosk 102. The scrolling content may include scrolling selections 616 and/or scrolling messages 618. In some instances, when the prospective user stops, the UI 608 may stop scrolling, and so forth. Thus, the UI 608 may mimic movement of the prospective user 610 to attract attention by the user. The scrolling selections 616 may be selected based on information about the user (e.g., appearance, speed, direction of travel (to terminal, to baggage claim, etc.), height, presence of kids/family, etc.), environmental factors (e.g., time of day, departing/arriving vehicles, temperature, etc.), and so forth. The scrolling messages 618 may provide information to the user to induce engagement with the kiosk 102. Engagement with the kiosk 102 includes the user actively viewing content on the kiosk and/or making gestures, sounds, or providing other input to the kiosk 102 to cause desired option of the kiosk 102. Thus, engagement includes active participation with the kiosk 102, while the prospective user 610 may only show passive engagement (not intending to interact with the kiosk 102 yet) as he or she walks near the kiosk 102.

In some embodiments, the kiosk 102 may interact with a user that is not associated with a user device to provide instructions to the user for future use of the kiosk or for other reasons. In other words, the UI 608 may vary a presentation depending on whether the prospective user 610 is associated with a qualified user device or is not associated with a qualified user device, where the user device is "qualified" when capable of interacting with the kiosk 102 and receiving a high speed data transfer of content. User devices may be deemed qualified by an identifier of the device, hardware that is detectable from the user device, and/or using other known techniques.

Figure 6C:
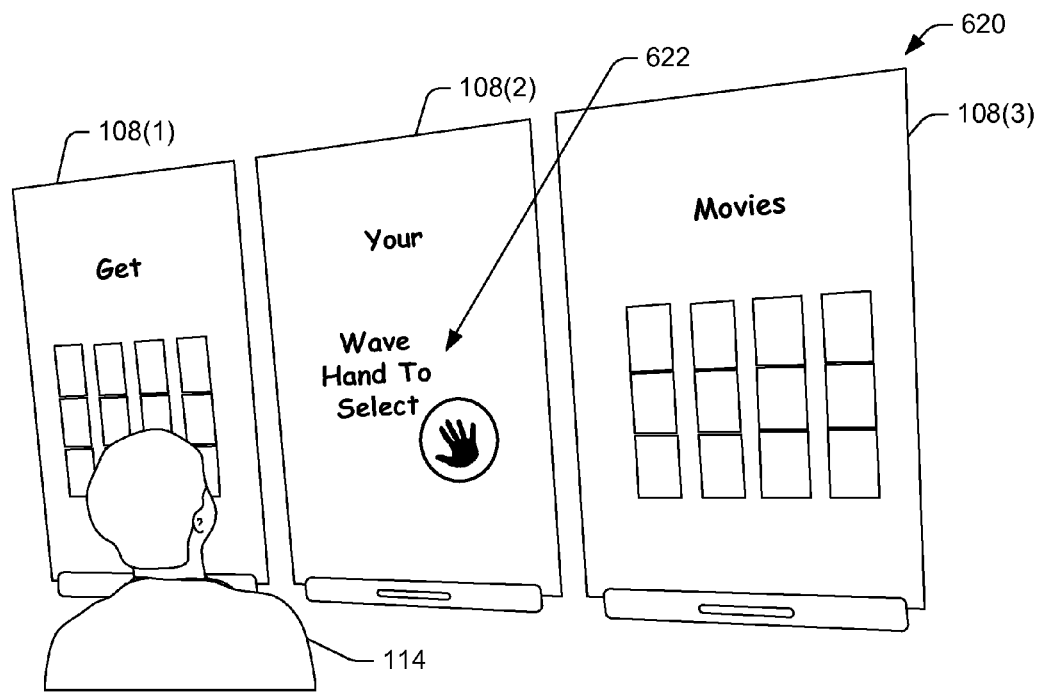

FIG. 6C shows an illustrative UI 620. The UI 620 may provide an instruction 622 to the user 110, who is now engaged in use with the kiosk 102, to help the user 110 to effectively interact with the kiosk 102. The instruction 622 may be provided on a monitor nearest to the user 114 or any other space on the UI 620. The UI 620 may continue to show other selection on other monitors or on other spaces.

In some embodiments, the kiosk 102 may be able to interact with multiple users at a same time. For example, each monitor may include an instance of the HSDT component 106. Thus, a first user may interact with the first monitor 108(1) while a second user may interact with the second monitor 108(2). When only a single user interacts with the kiosk 102, multiple ones of the monitors 108 may be used to provide content to the single user. However, when additional users interact with the kiosk 102 at a same time, different monitors may be used to present content to corresponding users. As shown in the UI 620, the second monitor 622 provides the instructions to the user 110 while the first monitor 108(1) and the third monitor 108(3) may provide selection and/or information to the user or other prospective users. For example the content on the third monitor 108(3) may scroll and/or provide a graphical display to attract attention of a second user as discussed above with reference to the UI 608 when the second user moves near the third monitor.

Figure 6D:
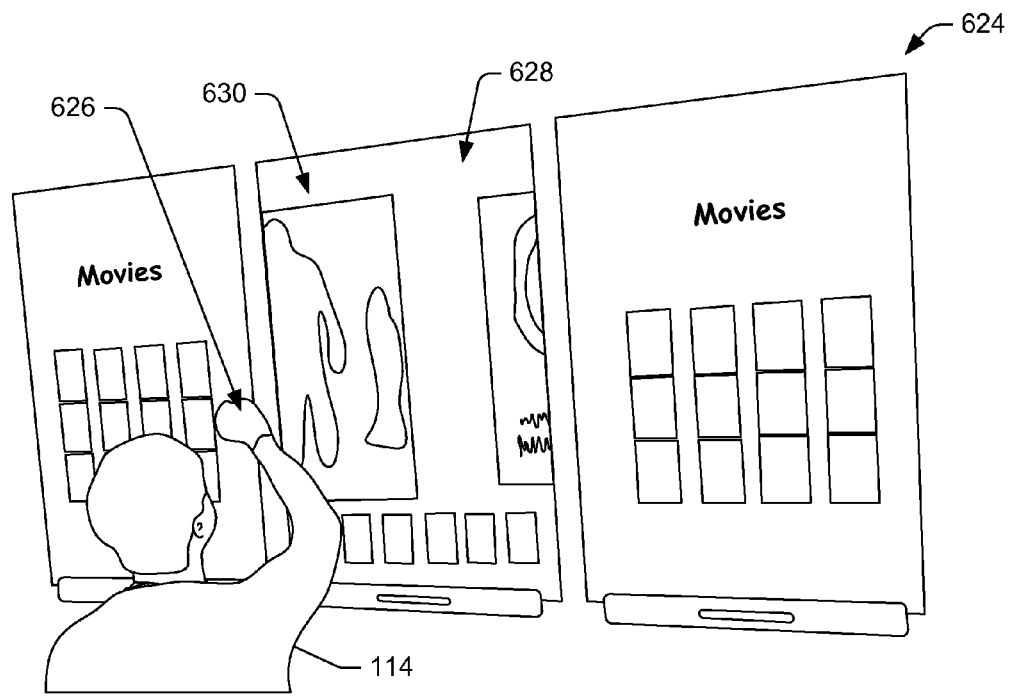

FIG. 6D shows an illustrative UI 624 that is updated based on user gestures 630. However, the UI 624 may be updated based on other input, such as speech, keyed input, and so forth. The UI 624 may be provided in a focus space 628, which may be defined by one of the monitors or possibly across multiple monitors. The user 114 may then interact with the content in the focus space 628 via the gestures 626 and/or other inputs. The UI 624 may provide navigation controls, search controls, selection controls and other content manipulation controls in the focus space to allow the user 114 to move between content in an intuitive manner (e.g., using hand gestures, etc.), preview content, search for content, and select the content to initiate a high speed data transfer of the content from the kiosk 102 to the user device 104.

Figure 6E:
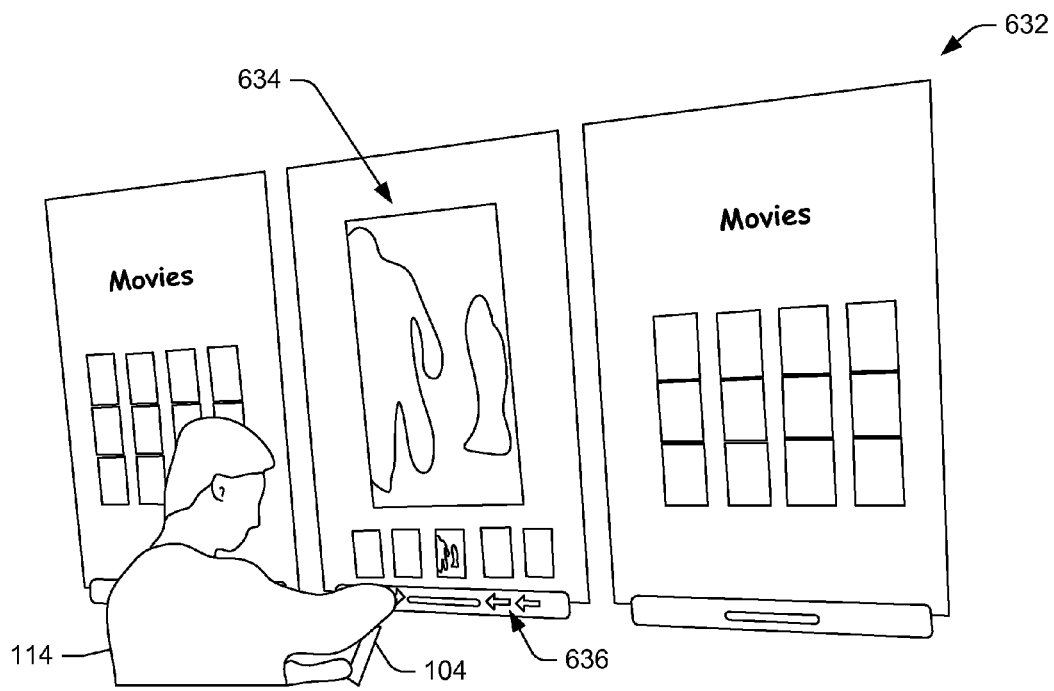

FIG. 6E shows an illustrative UI 632. The UI 632 shows a selection 634 by the user. The UI 632 may provide instructions to the user to retrieve the user device 104 and place the user device 104 at a specified location or space adjacent to the kiosk 102, such as at HSDT component 106 indicated by indicators 636. The instruction may be provided by textual messages, visual messages, audio messages, or a combination thereof. For example, a video may be used to show a person holding a user device up to the HSDT component 106 in the video, which may be effective for communicating with users who are not fluent in a local language. In some embodiments, the selection 634 may be more private than shown in the sample UI 632.

Figure 6F:
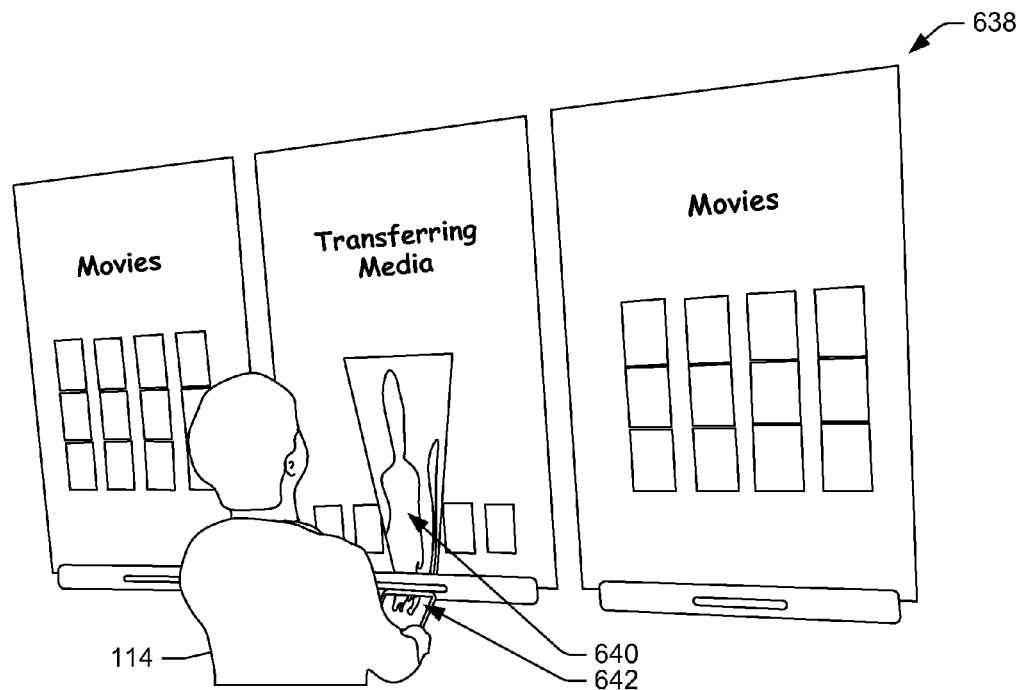

FIG. 6F shows an illustrative UI 638. The UI 638 shows animation of the content being downloaded to the user device 104 when the user device 104 is positioned in the designated space proximate to the HSDT component 106. The animation may depict the content being funneled into the device by incorporating kiosk display elements 640 of the kiosk 102 and possibly by also incorporating device display elements 642 using a display of the user device 104. The speed of the funneling of the animation provided by the kiosk 102 may coincide with the amount of time to transfer the content, and thus may act as a status meter or progress meter.

Figure 6G:
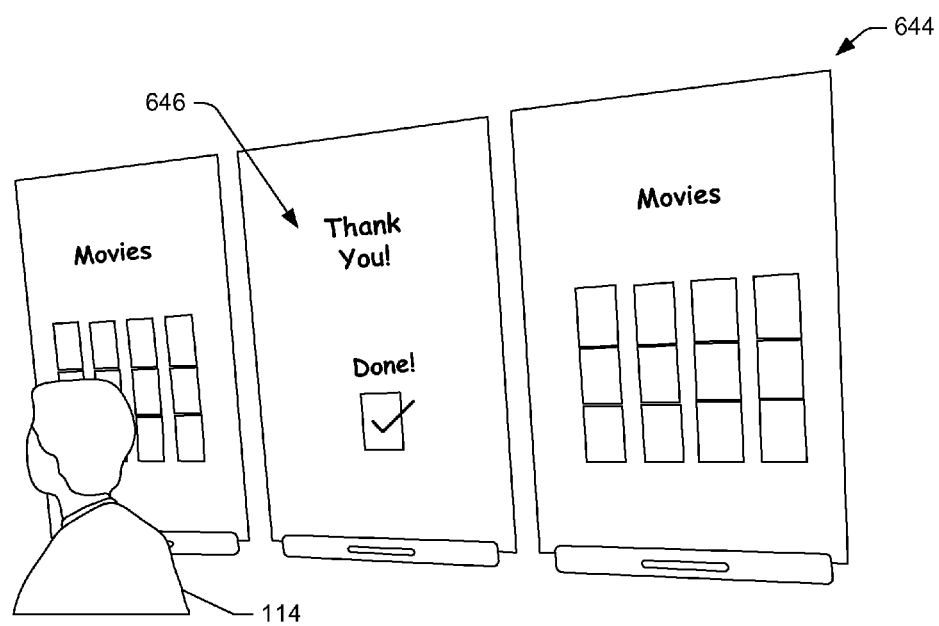

FIG. 6G shows an illustrative UI 644. The UI 644 shows a completion graphic 646 that indicates that the high speed data transfer is complete. The user 114 may then continue to his or her destination. In accordance with one or more embodiments, the UIs described with reference to FIGS. 6A-6G may enable a user to select content quickly and then download the content using the HSDT component 106 to obtain the content in a matter of seconds. Thus, the user experience may be enhanced by the simplicity and speed of the interaction between the user 114 and the kiosk 102.

FIGS. 7 and 9-12 are flow diagrams of illustrative processes. The processes are illustrated as a collection of blocks in a logical flow graph, which represent a sequence of operations that can be implemented in hardware, software, or a combination thereof. In some instances, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
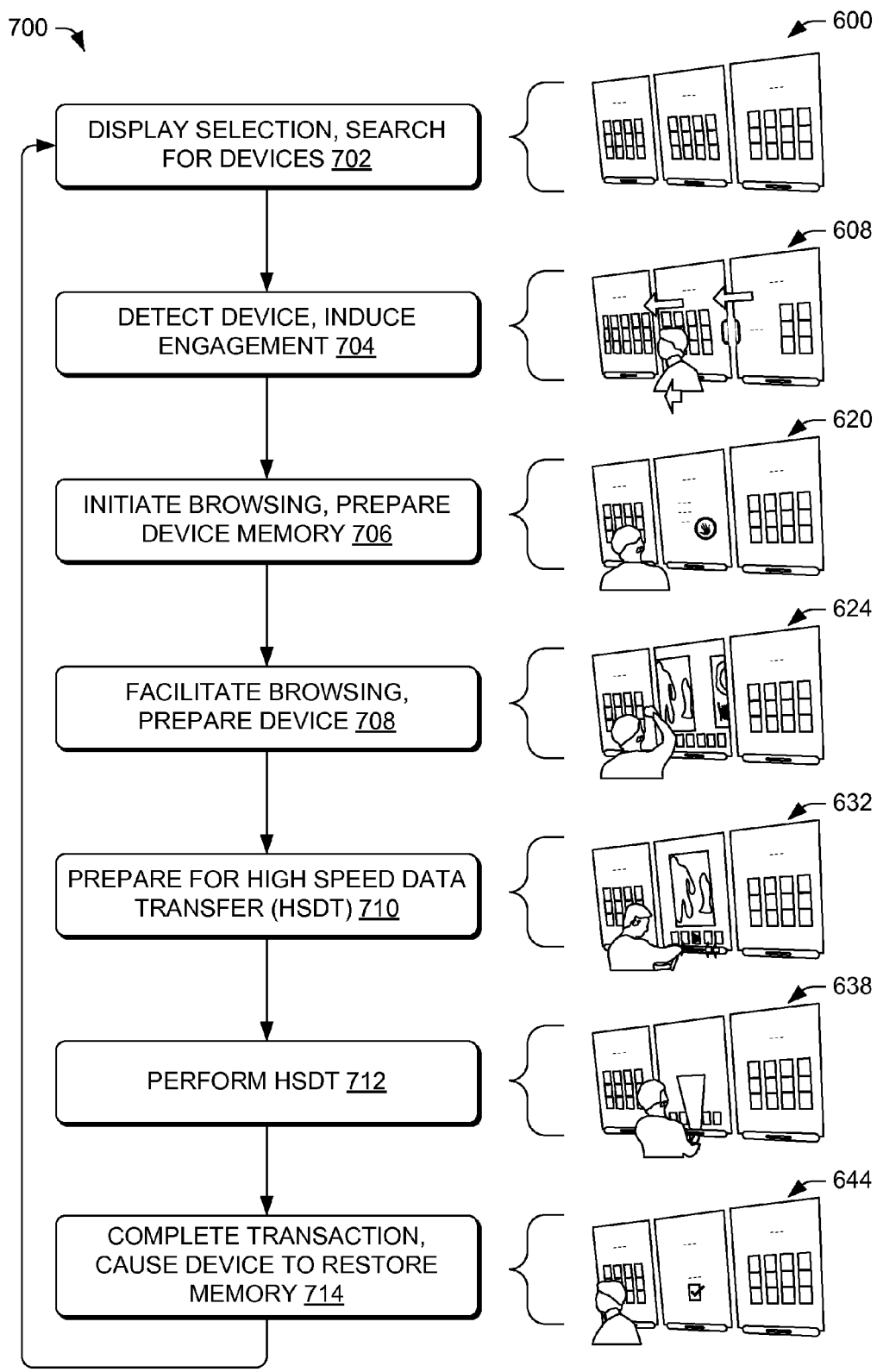
FIG. 7 is a pictorial flow diagram of an illustrative process of providing high speed data transfer using the kiosk.

FIG. 7 is a pictorial flow diagram of an illustrative process 700 of providing high speed data transfer using the kiosk 102. While the discussion with reference to FIGS. 6A-6G focused on the UIs of the kiosk 102, the process 700 focuses on data processing by the kiosk 102. The process 700 is described with reference to the environment 100 and may be performed by the kiosk 102 in cooperation with the user device 104.

At 702, the UI module 306 may determine selections of content to display prior to engagement of a user, such as the user 114, with the kiosk 102. The UI module 306 may update the selections based on one or more factors, such as a time of day, a location, upcoming departures/arrivals of transit, attributes of passer-bys and/or other information available to the UI module 306. The UI module 306 may update the selections using the kiosk content library on a random basis, periodically, or at other times. The selections may be updated individually (e.g., block by block), in groups, or all at once to create a new or dynamic display. Meanwhile, the kiosk 102 may search for devices carried by users that pass near the kiosk 102. The search may try to identify user devices that are configured to receive a download via the HSDT component 106. The kiosk 102 may monitor for user devices via the LPWC component 320 or by other known techniques (e.g., image analysis, Wi-Fi detection, etc.).

At 704, the kiosk 102 may detect a compatible user device based on the searching for the devices at the operation 702, and may then attempt to induce engagement by an associated prospective user. As discussed above, the UI module 306 may modify the presentation using a graphical display to attract attention of the prospective user, such as by causing the selections, graphics, and/or messages to scroll in synchronization with movement of the user. As another example, when the kiosk 102 is located in a terminal of an airport, the UI module 306 may receive information about departures and arrivals at nearby gates. The UI module 306 may predict that a user is walking in a direction of a gate with a specific departure (e.g., an international flight to Italy, etc.), and may then provide a presentation of selections of content related to Italy, for example. In some embodiments, the UI module may even provide explicit messages, such as "Traveling to Italy Today?" and so forth to attract the user's attention. The UI module 306 may even identify a specific user via the imaging sensors 316, such as by projecting the user's image on the display, pointing a graphical arrow image in a direction of the user, or creating or selecting other animations to attract the prospective user's attention. When multiple prospective users are identified, the UI module 306 may use separate devices (separate instances of the monitors 108, etc.) to attempt to engage some of the multiple prospective users.

At 706, the UI module 306 may provide instructions on how to interact with the kiosk 102, such as by providing gesture commands, audio commands, and/or keyed input. In some embodiments, the kiosk 102 may request consent by the user to prepare the user device 104 associated with the user 114 for a high speed data transfer of content. When the user device 104 is actively being used, such as when it is engaged in an active telephone call, an active download, etc., then the kiosk 102 may request the user to end at least some of those tasks. However, in some instances, the user device 104 may have enough memory to maintain some tasks while receiving content via a high speed data transfer, such as when the user device has enough of the high speed memory 404 to accommodate the multiple tasks of the transfer and the current tasks or a subset of the current tasks. The LPWC component 320 of the kiosk 102 may communicate with LPWC component 410 of the user device 104 to prepare the user device to receive data via a high speed data transfer. For example, the kiosk 102 may prepare the user device 104 by requesting the user device to free space in the high speed memory 404, which can then accommodate rapid writing of data (e.g., storage) of transferred content via the HSDT component 106.

At 708, the UI module 308 may facilitate browsing, which may include browsing the selections available in the kiosk content library 312 by recognition of gestures captured by the image sensor and converted to meaningful commands, audio captured by the microphones 318 and converted to meaningful commands, and/or inputs received in other ways (e.g., virtual or physical controls, etc.). Meanwhile, the LPWC component 320 of the kiosk 102 may continue to communicate with LPWC component 410 of the user device 104 to free space in the high speed memory 404 of the user device and/or perform other operations to prepare the user device 104 for receipt of data via a high speed data transmission.

At 710, the HSDT component 106 may be loaded with the content to transfer to the user device 104. Meanwhile, the UI module 306 may instruct the user 114 to obtain the user device 104 and position the user device proximate to the HSDT component 106 within a specified zone or distance. The kiosk 102 may detect and/or monitor location of the user device 104 via the LPWC component 320 and/or the imaging sensors 316, such as to determine when the device is located in a correct position. In some embodiments, the kiosk 102 may include physical features that define and/or sense a location of the user device for the data transfer. For example, the features may include a button that is depressed by presence of the user device proximate to the HSDT component 106.

At 712, the HSDT component 106 may transfer the content to the user device 104 via the HSDT component 408 of the user device 104. The user device 104 may store the received content in the high speed memory 404, and thus receive the content in a relatively short amount of time, such as in less than a few seconds for a standard or high definition full length movie.

At 714, the UI module 306 may provide a message that the transfer is complete by text, an animation, a sound, and/or other information. Meanwhile, the LPWC component 320 may instruct the user device 104 to move the received content from the high speed memory 404 to the main data storage 406 and then restore pre-existing data in the high speed memory 404 to enable the user device 104 to resume functionality. In some instances, the kiosk 102 may cause the user device 104 to delay restoring the pre-existing data in the high speed memory 404 when another transfer is queued up for the user device 104.

In some embodiments, the UI module 306 may facilitate a payment or non-payment transaction with the user device 104. For example, the UI module 306 may process a payment for the service of providing the content to the user device 104. The payment may be debited from a pre-existing account associated with the user 114 or may be received from a payment instrument via the UI module 308. Non-payment transactions may be used to record content consumed by the user for various reasons, such as to enforce quotas or limits, ensure the user is eligible for the service, and/or for other reasons.

Figure 8A:
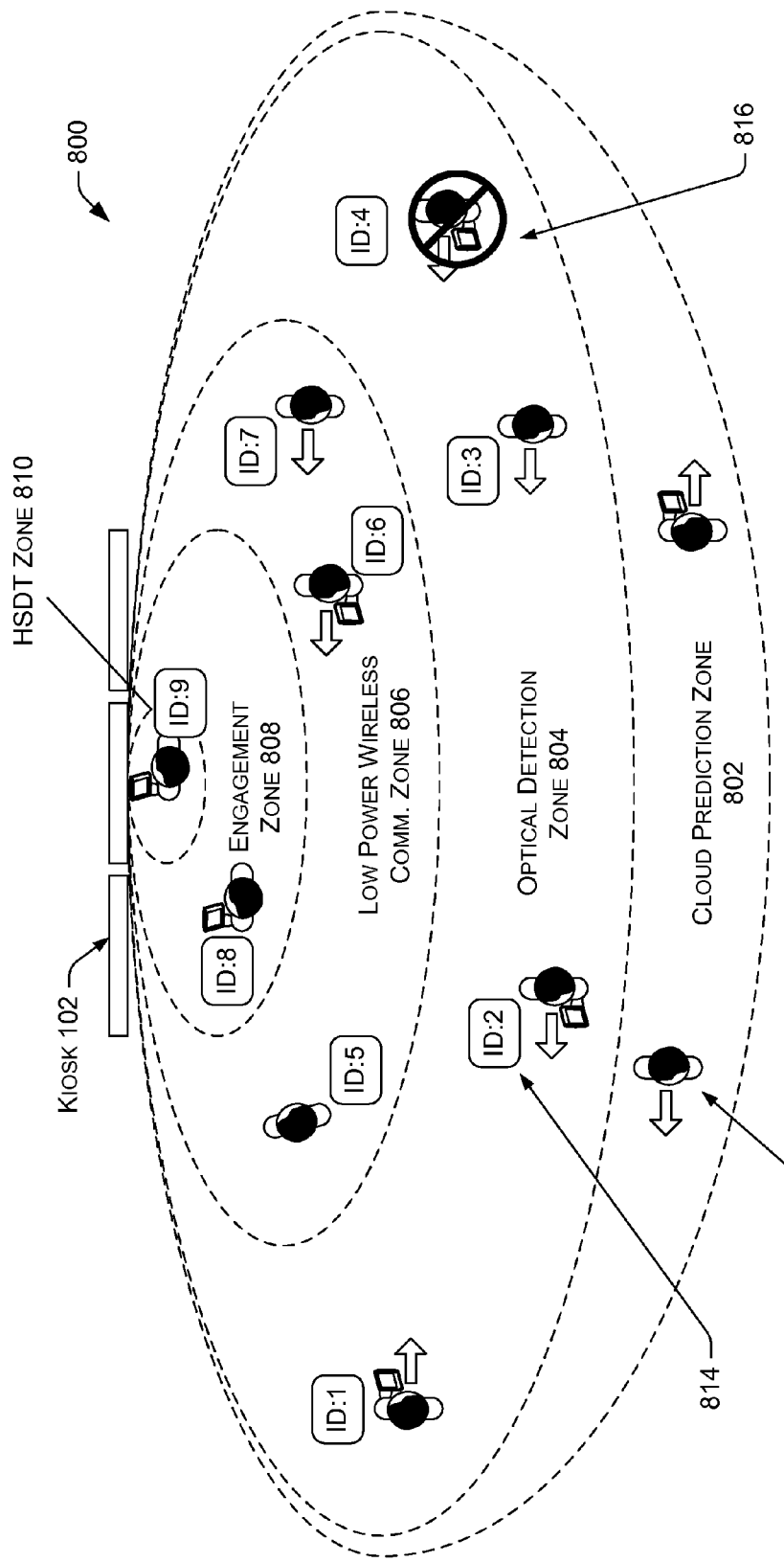
FIGS. 8A-8B are schematic diagrams showing use of various zones associated with the kiosk.

FIG. 8A is a schematic diagram showing use of various zones 800 associated with the kiosk 102. In accordance with some embodiments, the zones 800 may include a cloud prediction zone 802, an optical detection zone 804, a LPWC zone 806, an engagement zone 808, and a HSDT zone 810, each described in turn. The zones may be populated with people 812. Some people may have a user device such as the user device 104 while other people may not have a user device or have a user device that is compatible for interaction with the kiosk 102. As shown in FIG. 8A, the people may be moving (represented by arrows) or standing still (denoted by absence of arrows). The zones 800 may include a temporal aspect. The zones may overlap such that the larger zones cover or overlap the smaller zones.

The cloud prediction zone 802 may include users that are predicted to be in the vicinity of the kiosk 102 by the cloud prediction device 120, such as based on the user data processed by the location prediction module 508. Although many people may be within a vicinity of the kiosk 102 based on happenchance and/or for other reasons, some specific people may be predicted to be near the kiosk 102 by the cloud prediction module 508. The kiosk 102 may use this information to serve targeted information to these users to attract their attention and/or provide content of interest for their acquisition via a high speed data transfer.

The optical detection zone 804 may be an area where the image sensor 316 is capable of detecting a prospective user and/or information about the user. The information about the user may include the user's movement direction, a direction the user faces, eye contact with the kiosk 102, and/or other relevant information to detect possible engagement with the kiosk 102. As shown in FIG. 8A, the kiosk 102 may assign an identifier 814 to each user detected within this zone. The kiosk 102 may use the identifier to track each specific user while within the optical detection zone.

The LPWC zone 806 may be an area where the LPWC component 320 is capable of detecting a user device associated with a person. The LPWC component 320 may ping or otherwise communicate with a corresponding LPWC component 410 of the user device. The kiosk 102 may associate an image of the user via the image sensor 316 with a detected device that is detected via the LPWC component 320 in the LPWC zone 806. In various embodiments, this association may be stored in association with the identifier 812 assigned to the user. The user device may also include an identifier that is unique to the device. In some embodiments, when the LPWC zone 806 is unable to detect user devices that are compliant with the kiosk 102 and/or the HSDT component 106, the kiosk 102 may provide content to advertise use of the kiosk, such as to educate a passerby about types of user devices that work with the kiosk, functionality of the kiosk, and/or provide other types of advertising. After detecting a user device that is compliant with the kiosk 102, the kiosk may then begin to attempt to attract the user to interact or engage with the kiosk as discussed herein. As discussed above, some user devices or users may not provide consent for interaction with the LPWC device 320 and/or may not be configured to interact with the HSDT device 106, and thus may be unavailable devices 816.

The engagement zone 808 may be an area where the user 114 is determined to be engaged with the kiosk 102, such as by visual cues, receipt of gestures and/or other received inputs, and/or other cues. While in the engagement zone, the user 114 may interact with the kiosk 102 to browse content, sample content, select content, and so forth as discussed herein.

The HSDT zone 810 may be an area where the user device 114 is capable of receiving the high speed data transfer via the HSDT component 106. The HSDT zone 810 may be defined at least partly by data transmission limits of the HSDT component 106. The HSDT zone 810 may be an area for location of the user device, the user, or both.

Figure 8B:
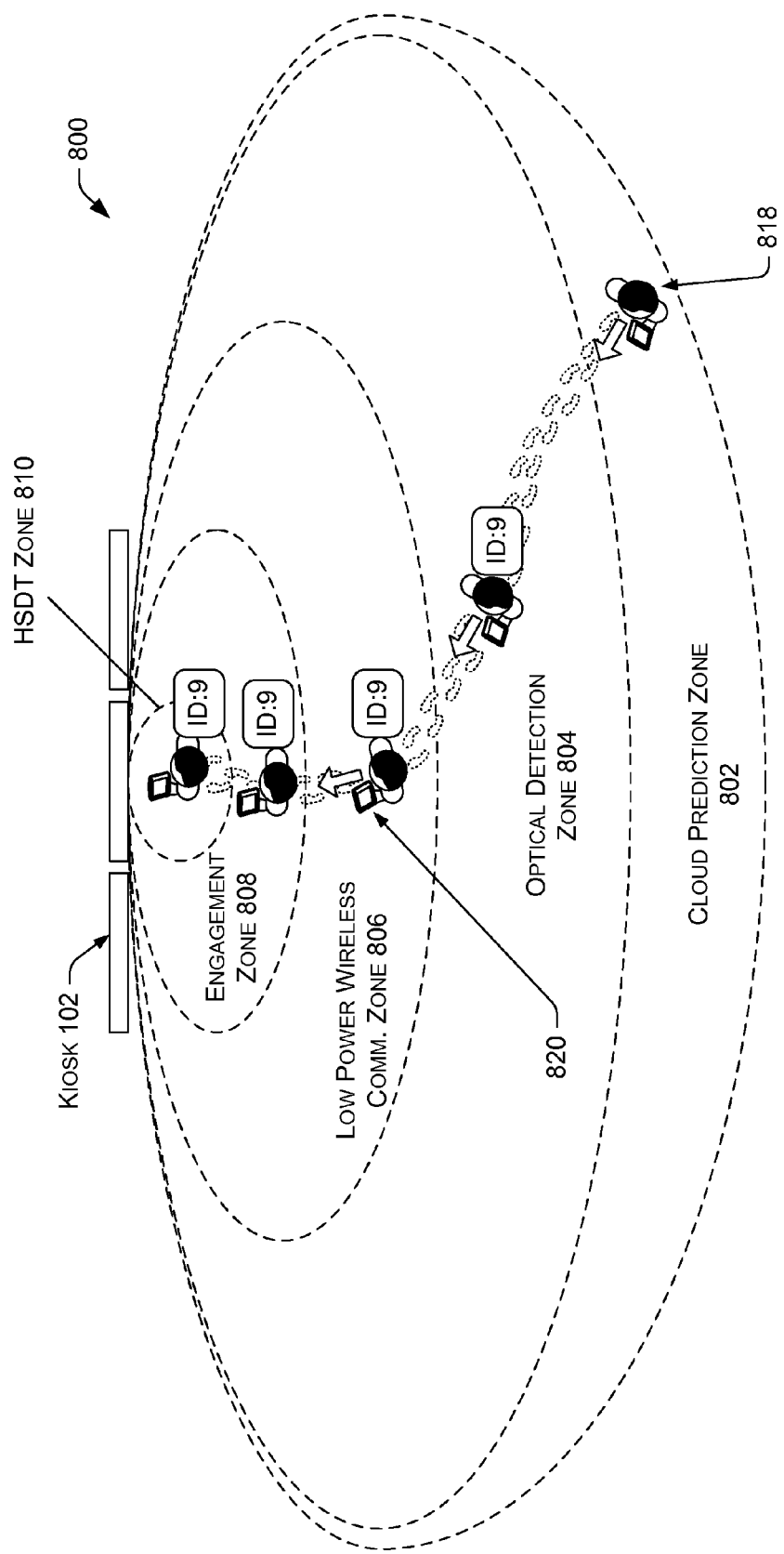

FIG. 8B shows illustrative tracking of a user 818. The user 818 may be predicted to be within the cloud prediction zone 802 at a particular time or time range based at least partly on data received by the cloud prediction device 120. For example, the user 818 may have provided, directly or indirectly, travel information to the cloud prediction device 120. In anticipation of the user 818 being within the cloud detection zone 802, the kiosk 102 may be loaded with content to help attract the attention of the user 818 and/or with content that may be desirable for the user 818 to receive via the HSDT component 106.

The user 818 may move into the optical detection zone 804 and may be detectable by the image sensor 316. The kiosk 102 may use biometric recognition, such as facial recognition, to positively identify the user 818 as one of the users expected to be in the cloud prediction zone 802. The kiosk 102 may then provide personalized content to attempt to attract the user 818 to the kiosk 102. In some embodiments, when positive identification is not possible, the kiosk 102 may assume that the user 818 is present in one of the zones 800 based on the user's predicted presence in the cloud prediction zone 802, and therefore may provide the personalized content without a positive identification.

The user 818 may move into the LPWC zone 806 and may then be detectable by the LPWC component 320. The kiosk 102 may use the LPWC component 320 positively identify a user device 820 associated with the user 818. In turn, this positive identification may be used to identify the user 818. The kiosk 102 may then provide personalized content to attempt to attract the user 818 to the kiosk 102. However, as discussed above, when positive identification is not possible in this zone, the kiosk 102 may assume that the user 818 is present in one of the zones 800 based on the user's predicted presence in the cloud prediction zone 802, and therefore may provide the personalized content without a positive identification.

The user 818 may then move into the engagement zone where the kiosk 102 may present a UI such as the UI 620 to initiate user interaction with the kiosk. After selection of content to be received by the user device 820, the user 818 (or possibly the user device 820) may enter the HSDT zone 810 where the user device 820 may receive content via a high speed data transfer.

Figure 9:
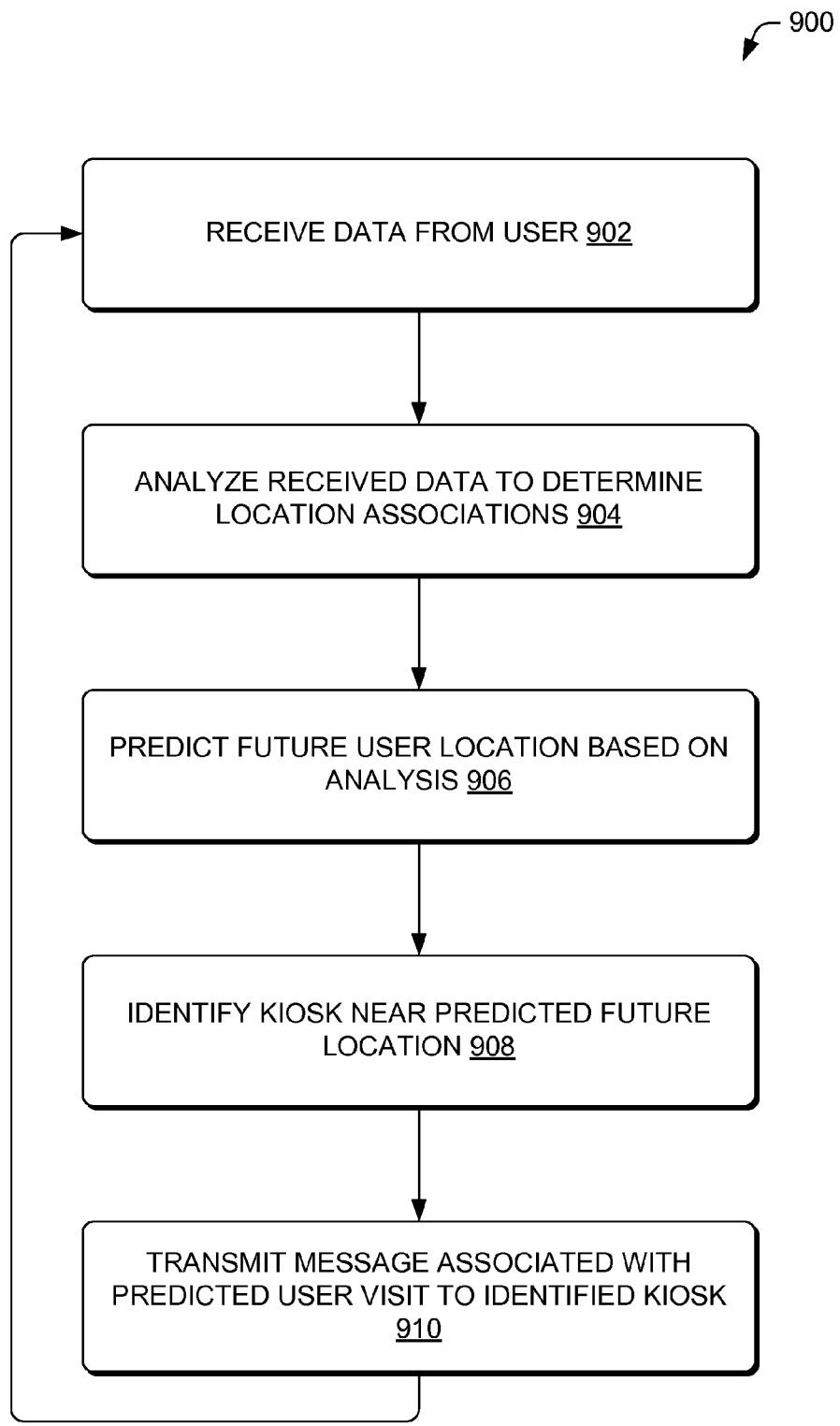
FIG. 9 is a flow diagram of an illustrative process of predicting a future user location near a kiosk.

FIG. 9 is a flow diagram of an illustrative process 900 of predicting a future user location near a kiosk. The process 900 shows the collection of blocks organized under respective entities that may perform the various operations described in the blocks. However, other devices or software may perform the respective operations. The process 900 is described with reference to the environment 100 and may be performed by the cloud prediction device 120 in cooperation with the kiosk 102 and/or the content provider 116.

At 902, the cloud prediction device 120 may interact with the user 114, possibly via the user device 104, to determine information received from the user. For example, the user 114 may provide travel information for access by the cloud prediction device 120. As another example, the user 114 may provide information indicating a future task of the user, such as to pick up a package at a public secure locker that has been delivered to the locker for the user.

At 904, the cloud prediction device 120 may analyze the received data to determine at least one location association. For example, when the user data includes an event, the cloud prediction device may determine a physical location of the event (i.e., a specific venue, etc.).

At 906, the cloud prediction device 120 may predict a future location of the user at a time range based on the analysis. For example, when the data includes flight information for the user, the cloud prediction device 120 may predict that the user will be at a specific airport, or even a specific terminal or part of the airport during a time range based at least partly on the flight information and possibly on other data from other sources (e.g., flight data for the airport, etc.). The time may be based on the data, such as a start of the event and/or based on user trends. In some embodiments, the predicted future location may be along a route to the kiosk. For example, the cloud prediction device 120 may determine a likely route for the user to travel to the predicted future location, and may identify one or more kiosk on or near that route. The route may be based on the user's home or other expected origination location of the user prior to travel to the physical location. Thus, the predicted location may be the same as the physical location determined at the operation 904 or may be different than the location determined at the operation 904, such as any location along a route or a specific location.

At 908, the cloud prediction device 120 may identify a kiosk located near the predicted future location of the user. In the above example, the cloud prediction device 120 may identify a kiosk that is in a terminal associated with the user's flight. The cloud prediction device 120 may determine one or more kiosks located along a route expected for the user to take to get to a physical location, which include one or more predicted locations along the route.

At 910, the cloud prediction device 120 may transmit a message associated with the predicted future visit by the user to the identified kiosk and/or the content provider 116 to enable custom content for the user at the identified kiosk. For example, the content provider 116 may cause transmission of content predicted to be enjoyable for the user to the identified kiosk prior to the predicted arrival by the user at the kiosk.

In accordance with some embodiments, the kiosk may aggregate the user data with other user data to determine preferences of people that travel near the kiosk. The kiosk may aggregate user preferences and then determine content for a user and/or other users based at least in part on the aggregated user preferences.

Figure 10:
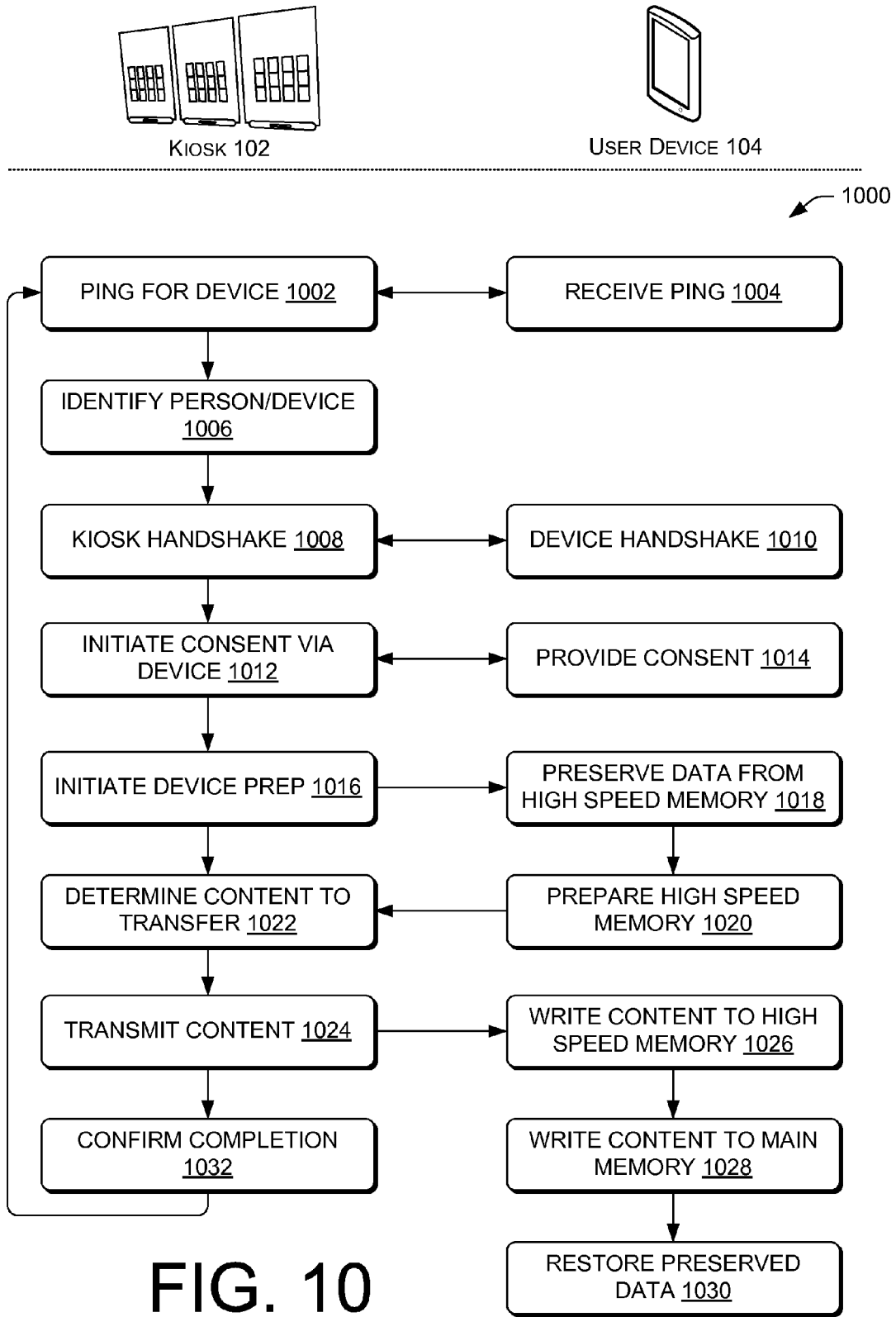
FIG. 10 is a flow diagram of an illustrative process of preparing the user device for the high speed data transfer.

FIG. 10 is a flow diagram of an illustrative process 1000 of preparing the user device for the high speed data transfer. The process 1000 shows the collection of blocks organized under respective entities that may perform the various operations described in the blocks. However, other devices or software may perform the respective operations. The process 1000 is described with reference to the environment 100 and may be performed by the kiosk 102 in cooperation with the user device 104.

At 1002, the kiosk may search for a user device that is configured to support high speed data transfer, such as the user device 104. The kiosk 102 may use the LPWC component 320 to ping for the user device 104, which may be received by the user device at 1004. In some embodiments, the user device 104 may return a message, via the LPWC component 410 or another device, which confirms that the device is configured to support high speed data transfer.

At 1006, the kiosk 102 may identify and associate a person with a detected device. For example, the kiosk 102 may determine a location of a user device using the LPWC component 320 and determine a location of a user using the imaging sensor 316. The kiosk 102 may then associate the user device and the user when the location overlap or are within a predetermined threshold distance amount.

At 1008, the kiosk 102 may perform a handshake with the user device 104, via the LPWC component 320 and the LPWC component 410, respectively. The handshake may enable the devices to exchange information, such as encrypted or secure information. In some embodiments, the handshake may enable communication between the respective devices for other data transmission types, such as the high speed data transfer, NFC communications, and/or other types of communications.

At 1012, the kiosk 102 may initiate consent via the user device 104, which may be provided by the user device at 1014 either actively (e.g., with a return message) or passively (without a rejection, etc.). For example, the user device 104 may indicate consent by the user 114 to prepare the user device 104 for a transfer of the content. In some embodiments, the consent may evaluate current usage of the device to determine whether to prepare the user device 104 for a transfer. Use of the device may include using a mobile telephone transceiver to maintain a telephone call, streaming video, playing music, downloading content, playing a game, and/or other types of actions performed by the user device 104. Some of these actions, when performed, may cause the user device 104 to reject consent to prepare the user device 104 for the transfer until the action is complete. Accordingly, the user device 104 may avoid dropping an active call and/or interrupting other important actions without user input to cause the actions to pause or terminate. However, in some instances, the user device 104 may have enough memory to maintain some actions while receiving content via a high speed data transfer, such as when the user device has enough of the high speed memory 404 to accommodate the multiple actions of the transfer and the current actions or a subset of the current actions. In some embodiments, the user device 104 may transmit usage information to the kiosk 102 to enable the kiosk to determine whether or not to proceed with preparing for a high speed data transfer. However, the user device 104 may make this decision and may reject the consent to transfer data based on current usage of the user device and/or other factors, such as user preferences, etc.

Some devices may outright reject communications from devices such as the kiosk 102 based on preselected user preferences while other user devices may allow and accept these communications based on preselected user preferences. In various embodiments, the user device 104 may prompt the user to confirm or deny a request, which may be provided via the operation 1014.

At 1016, the kiosk 102 may initiate preparation/readying of the user device for a possible high speed data transfer of the content. The kiosk 102 may transmit a message to the user device 104 to cause the user device to preserve data from the high speed memory 404, such as by backing this data up in another memory source (e.g., the main data storage 406, etc.), which may occur at the operation 1018.

At 1020, after backing up any necessary data from the high speed memory 404, the user device may prepare at least some of the high speed memory 404 to allow the memory to store the content from the kiosk (assuming content will be transferred at a later point in time). The preparing of the memory may include clearing memory, deleting memory, flagging memory as writable/available, and/or other techniques to enable writing new data to memory. When more than a threshold amount of memory is free in the high speed memory 404, the operations 1018 and 1020 may be omitted. At 1020, the user device 104 may transmit/send a message and/or data to the kiosk 102 that indicates that the user device has prepared the memory and is ready to receive a high speed data transfer.

At 1022, the kiosk 102 may determine content to transmit to the user device 104, such as in response to a selection made by the user 114 via a gesture, a spoken word, and/or another input. At 1022, the kiosk 102 may receive a message and/or data from the user device that indicates that the user device has prepared the memory and is ready to receive a high speed data transfer.

At 1024, the HSDT component 106 may transfer the content to the user device 104 for receipt at 1026, via the HSDT component 408, based on the user device 104 being properly positioned with respect to the kiosk 102 and the HSDT component 106. For example, the user device 104 may be located within a predetermined distance from the HSDT component 106 to be properly positioned with respect to the kiosk 102. The HSDT component 408 may write the received content to the high speed memory 404 at 1026 using at least some of the space cleared at the operation 1020.

At 1028, the user device 104 may write the content from the high speed memory 404 to the main data storage 406 at a time after the transfer of the content is completed by the kiosk 102. For example, the operation 1028 may occur when the user 114 is walking away from the kiosk 102. Thus, the user 114 may only need to position the user device 104 near the HSDT component 106 for a brief moment (e.g., less than a few seconds), and then can leave the area near the kiosk 102 while the user device 104 performs the operation 1028 and an operation 1030. At 1030, the user device 104 may restore the preserved data (from the operation 1018) from the main data storage 406 to the high speed data storage 404, and thus resume operations that may have occurred prior to the operation 1018.

At 1032, the kiosk 102 may confirm completion of the transfer of the content by a visual, animation, a sound, and/or text. The kiosk 102 may then loop back to the operation 1002. In some embodiments, the kiosk 102 may be configured to engage with more than one device/user at a time. To perform this, the kiosk 102 may include multiple instances of some devices, such as multiple instances of the HSDT component 106.

Figure 11:
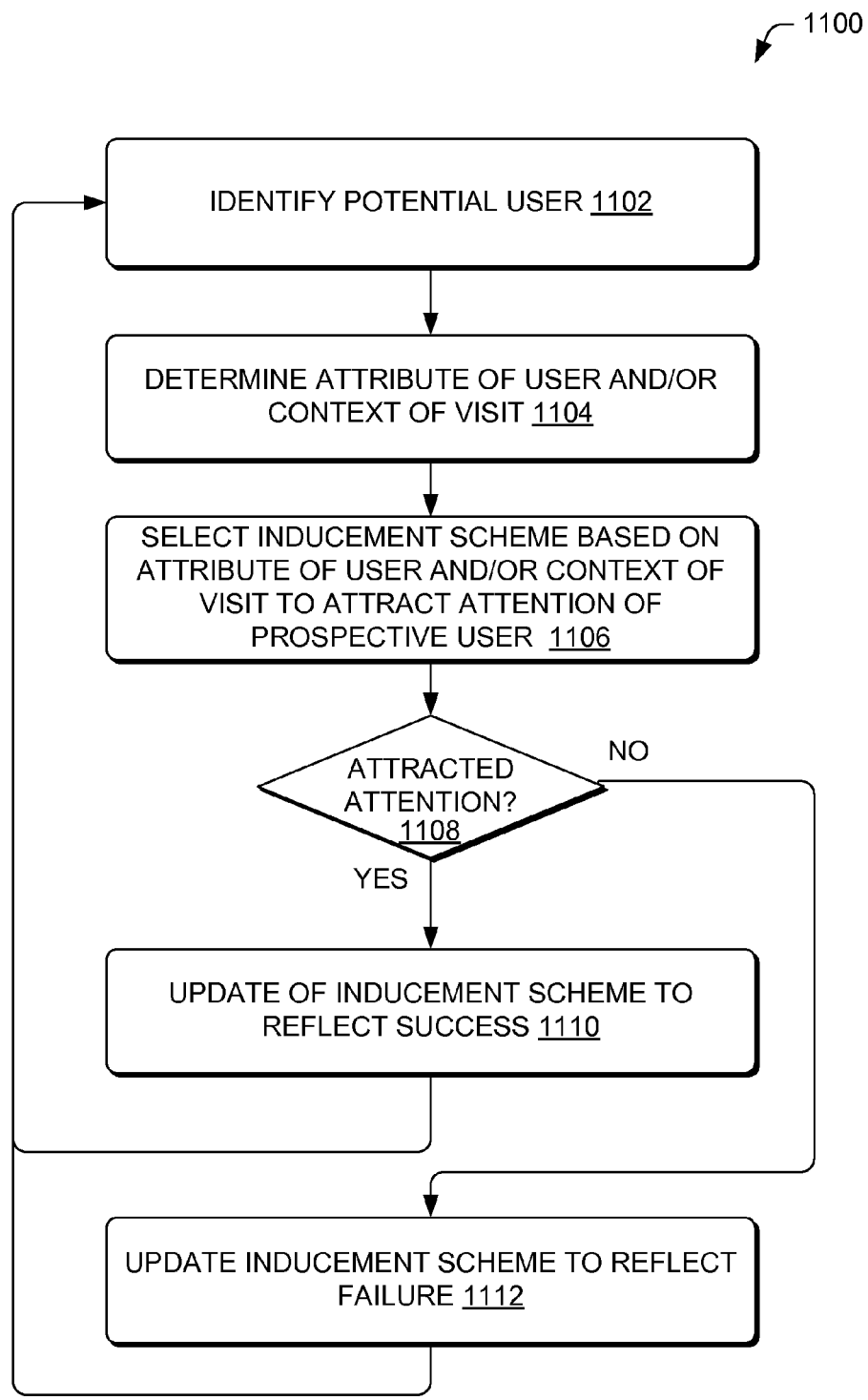
FIG. 11 is a flow diagram of an illustrative process of inducing user engagement of the kiosk. The process may use machine learning to continually improve and/or adapt a user engagement process to changing circumstances.

FIG. 11 is a flow diagram of an illustrative process 1100 of inducing user engagement of the kiosk 102. The process 1100 may use machine learning to continually improve and/or adapt the engagement process to changing circumstances. The process 1100 is described with reference to the environment 100 and may be performed by the kiosk 102.

At 1102, the kiosk 102 may identify a prospective user and associated user device. For example, the kiosk 102 may determine a location of a user device using the LPWC component 320 and determine a location of a user using the imaging sensor 316. The kiosk 102 may then associate the user device and the user when the location overlap or are within a predetermined threshold distance amount.

At 1104, the kiosk 102 may determine an attribute of the user and/or a context of the visit of the user in an area surrounding the kiosk 102. The kiosk may determine the attribute of the user based at least in part on image data of the user captured by the image sensors 316. The image data may reveal information, such as clothing, logos, hair color, eye color, presence of glasses, and/or other information that may be used as an attribute. The context of the visit may include a time of the visit, a location, surrounding events (e.g., arrivals/departures of transit, etc.), noise levels, and/or other environmental information that may be identified to determine how to best induce engagement by the user.

At 1106, the UI module 306 may select an inducement scheme based on the attribute(s) of the user and/or the context of the visit in order to attract attention of the prospective user. For example, if the environment is noisy, the UI module 306 may determine to rely on visual image data rather than on audio emitted from the speakers 314 to attract the user's attention. If the environment is very bright, then the UI module 306 may determine to rely on audio emitted from the speakers 314 to attract the user's attention rather than visual displays via the monitor(s) 108. The UI module 306 may store a plurality of inducement schemes, which may be associated with various attributes that have historical statistical relationships to success of the scheme at capturing the prospective user's attention. The inducement schemes may provide a variety of different graphical displays intended to attract attention of users that pass by the kiosk 102.

At 1108, the kiosk 102 may determine whether the prospective user's attention has been attained. The kiosk 102 may update the inducement schemes based on the information collected at the operation 1104 and a determination from the decision operation 1108 as to whether the prospective user's attention has been attained, such as by the user beginning to interact with the kiosk 102, turning to face the kiosk 102, stopping, or performing some other action recognized as attention toward the kiosk 102. Following a determination that the prospective user's attention is attained (following the "yes" route from the decision operation 1108), the process 1100 may advance to an operation 1110. At 1110, the kiosk 102 may update the inducement scheme to reflect the success of the attained attention. The update may include adjusting a weight of an attribute, adjusting a weight of a context of the visit, and/or associating a new attribute and/or context with the inducement scheme. Following the operation 1110, the process may proceed to the operation 1102 to perform a loop of the process 1100.

Following a determination that the prospective user's attention is not attained (following the "no" route from the decision operation 1108), the process 1100 may advance to an operation 1112. At 1112, the kiosk 102 may update the inducement scheme to reflect the failure of the attained attention. The update may include adjusting a weight of an attribute, adjusting a weight of a context of the visit, and/or removing an association between the inducement scheme and an attribute and/or context. Following the operation 1112, the process may proceed to the operation 1102 to perform a loop of the process 1100.

In some embodiments, the kiosk 102 may offload some processing of the updates to the content provider 116 or another device. Machine learning may be used to perform the updates in the operation 1110 and/or 1112 by performing detailed analysis of aggregated data, possibly from multiple kiosks, to create weighted associations between the attributes and the inducement schemes and/or weighted associations between the contexts and the inducement schemes.

Figure 12:
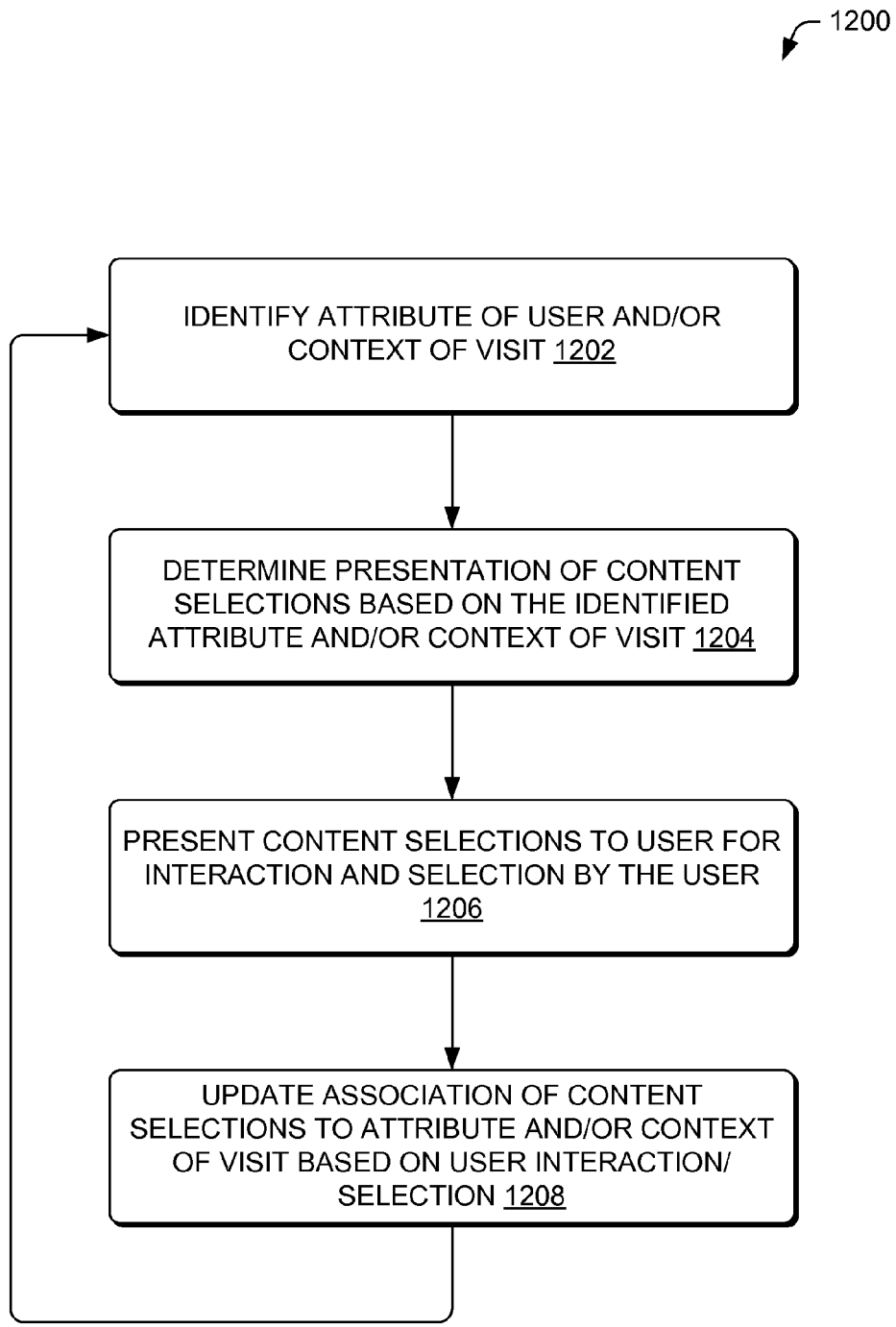
FIG. 12 is a flow diagram of an illustrative process of selecting content for presentation to a user. The process may use machine learning to continually improve and/or adapt a selection process to changing circumstances.

FIG. 12 is a flow diagram of an illustrative process 1200 of selecting content for presentation to a user. The process 1200 may use machine learning to continually improve and/or adapt the selection process to changing circumstances. The process 1200 is described with reference to the environment 100 and may be performed by the kiosk 102.

At 1202, the kiosk 102 may determine an attribute of the user and/or a context of the visit of the user in an area surrounding the kiosk 102. The kiosk 102 may determine the attribute of the user based on image data of the user captured by the image sensors 316. The image data may review information, such as clothing, logos, hair color, eye color, presence of glasses, and/or other information that may be used as an attribute. The context of the visit may include a time of the visit, a location, surrounding events (e.g., arrivals/departures of transit, etc.), noise levels, and/or other environmental information that may be identified to determine content that may be of interest to the user. In some embodiments, information may be obtained from a user device associated with the user, such an account identifier, which may indicate preferences of the user, historical purchase, and so forth. For example, the kiosk 102 may store unique data received from the device over time to enable building a transaction history associated with the device. The transaction history may then be used to select content suggestions (e.g., create recommendations) for the user as discussed in an operation 1204.

At 1204, the UI module 306 may determine presentation of content selections based on the identified attribute and/or context of the visit from the operation 1202. For example, if the user is accompanied by family, such as children, the UI module 306 may provide more selections that are kid-friendly so that the user can access these selections quickly when browsing via the kiosk 102. If the user appears to be an athletic person based on clothing and/or appearance (e.g., sports team shirt, athletic profile, etc.) as captured by the image sensors 316, then the UI module 308 may provide more selections associated with sports so that the user can access these selections quickly when browsing via the kiosk 102. When the environmental factors indicate that the user is walking toward a gate known to have a flight departing to a known location, the UI module 306 may provide more selections that relate to that known location (e.g., Italy, etc.) and/or can be consumed during time of the travel so that the user can access these selections quickly when browsing via the kiosk 102. Many examples exist on relationships that can be created to associate attributes with content selections and/or to associate context of visits with content selections.

At 1206, the content identified at least party in the operation 1204 may be provided to the user while browsing via the kiosk 102. For example, the selections may be presented early in the browsing described with reference to the UI 624 shown in FIG. 6D.

At 1208, the UI module 306 may update an association of the content selections with attributes and/or contexts of visits based on the user interaction during the browsing. The update may include adjusting a weight of an attribute, adjusting a weight of a context of the visit, and/or adding/removing an association between the inducement scheme and an attribute and/or context. Following the operation 1208, the process 1200 may proceed to the operation 1202 to perform a loop of the process 1200.

In some embodiments, the kiosk 102 may offload some processing of the updates to the content provider 116 or another device. Machine learning may be used to perform the updates in the operation 1208 by performing detailed analysis of aggregated data, possibly from multiple kiosks, to create weighted associations between the attributes and the content selections and weighted associations between the contexts and the content selections.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A method comprising,
   determining, via one or more computing devices, a future event associated with a user;
   determining a physical location associated with the future event;
   determining, based at least in part on the physical location of the future event, a future location of the user;
   identifying a kiosk associated with the future location of the user;
   determining, based at least in part on a profile associated with the user, user preferences associated with the user;
   identifying, based at least in part on the user preferences, content intended for the user; and transmitting, via the one or more computing devices, the content to the kiosk, the content being formatted for consumption using a user device associated with the user.

2. The method as recited in claim 1, wherein the future location of the user is different than the physical location of the event.

3. The method as recited in claim 1, wherein the identifying the kiosk further comprises:
   determining a route for the user to the future location, and
   wherein identifying the kiosk is based at least in part on the route.

4. The method as recited in claim 1, wherein the determining the future event further comprises accessing flight information associated with the user to determine a time of a departing flight at a first location or a time of an arriving flight at a second location.

5. The method as recited in claim 1, wherein the user preferences comprise first user preferences, the method further comprising:
   determining, based at least in part on profiles of other users predicted to be at or near the kiosk, second user preferences;
   aggregating the first user preferences and the second user preferences; and
   determining, based at least in part on the aggregated user preferences, the content for the user and the other users.

6. The method as recited in claim 1, wherein the content transmitted to the kiosk includes electronic content including at least one of a movie, a television show, an electronic document, or music.

7. The method as recited in claim 1, further comprising:
   determining a time range associated with the future location, and
   wherein the transmitting the content to the kiosk further comprises transmitting the time range to the kiosk.

8. The method as recited in claim 1, wherein the determining the future event includes accessing delivery information of an item associated with the user to determine a time of receipt of the item at a secure storage locker associated with the kiosk.

9. The method as recited in claim 1, wherein the profile includes at least purchase history information associated with the user to determine an entertainment event to be offered for sale by the kiosk.

10. The method as recited in claim 1, wherein the transmitted content indicates a predicted location of the user in a cloud prediction zone adjacent to the kiosk.

11. A device comprising:
    one or more processors; and
    memory to store computer-executable instructions that, when executed, cause the one or more processors to perform operations comprising:
      receiving travel information from a user device associated with a user, the travel information including at least one of a ticket, an itinerary, or a calendar entry;
      analyzing the received travel information;
      identifying, based at least in part on the analyzing, a future location of the user where the user is expected to be present;
      identifying, based at least in part on the identifying, a kiosk corresponding to the future location;
      accessing a profile associated with the user;
      identifying, based at least in part on the profile associated with the user, one or more user preferences; and
      sending, to the kiosk, content intended for the user and selected based at least in part on the one or more user preferences.

12. The device of claim 11, wherein the computer-executable instructions, when executed, further cause the one or more processors to perform operations comprising formatting the content for consumption on the user device.

13. The device of claim 11, wherein the profile includes at least purchase history information associated with the user.

14. The device of claim 11, wherein the computer-executable instructions, when executed, further cause the one or more processors to perform operations comprising:
    determining a time range associated with the future location; and
    wherein the sending the content to the kiosk further comprises sending the time range to the kiosk.

15. The device of claim 11, wherein the identifying the kiosk further comprises:
    determining a route for the user to the future location, and
    wherein the identifying the kiosk is further based at least in part on the route.

16. A computer-implemented method comprising:
    determining a future event associated with a user;
    determining a physical location associated with the future event;
    determining, based at least in part on the physical location of the future event, a future location of the user where the user is expected to be present;
    identifying a kiosk associated with the future location;
    transmitting content to the kiosk, the content being associated with one or more preferences of a profile of the user;
    receiving, from a mobile device associated with the user, an indication that the mobile device is capable of receiving the content; and
    sending, to the mobile device and based at least in part on receiving the indication, the content.

17. The computer-implemented method of claim 16, wherein the indication that the mobile device is capable of receiving the content is based at least in part on the mobile device having one or more components to facilitate high speed data transfer.

18. The computer-implemented method of claim 16, wherein the mobile device includes high speed memory, and wherein the method further comprises preparing, by freeing at least a portion of the high spend memory, the mobile device to receive the content.

19. The computer-implemented method of claim 16, wherein determining the future location is further based at least in part on accessing airport data to determine a route of the user to the future location.

20. The computer-implemented method of claim 16, further comprising formatting the content for consumption on a type of user device associated with the user.

* * * * *